US012654095B2

(12) United States Patent
Koriyama et al.

(10) Patent No.: US 12,654,095 B2
(45) Date of Patent: Jun. 16, 2026

(54) INPUT DEVICE, GAME CONTROLLER, AND INFORMATION PROCESSING APPARATUS

(71) Applicant: Nintendo Co., Ltd., Kyoto (JP)

(72) Inventors: Kazuhiko Koriyama, Kyoto (JP); Takanori Okamura, Kyoto (JP)

(73) Assignee: Nintendo Co., Ltd.

( * ) Notice: Subject to any disclaimer, the term of this patent is extended or adjusted under 35 U.S.C. 154(b) by 384 days.

(21) Appl. No.: 18/322,672

(22) Filed: May 24, 2023

(65) Prior Publication Data

US 2023/0293983 A1 Sep. 21, 2023

Related U.S. Application Data

(63) Continuation of application No. PCT/JP2020/047300, filed on Dec. 17, 2020.

(51) Int. Cl.
A63F 13/24 (2014.01)
(52) U.S. Cl.
CPC .................................... A63F 13/24 (2014.09)
(58) Field of Classification Search
CPC ....................................................... A63F 13/24
See application file for complete search history.

(56) References Cited

U.S. PATENT DOCUMENTS

| | | | |
|---|---|---|---|
| 5,432,530 A | 7/1995 | Arita | |
| 5,675,309 A | 10/1997 | Devolpi | |
| 5,724,068 A | 3/1998 | Sanchez | |
| 5,804,781 A | 9/1998 | Okabe | |
| 6,118,086 A | 9/2000 | Isikawa | |
| 6,153,876 A | 11/2000 | Fujita | |
| 6,189,401 B1 | 2/2001 | Atwell | |
| 6,231,444 B1 | 5/2001 | Goto | |
| 6,352,477 B1 | 3/2002 | Soma | |
| 6,589,118 B1 * | 7/2003 | Soma | A63F 13/24 |
| | | | 463/37 |
| 11,497,987 B2 * | 11/2022 | Okamura | A63F 13/92 |
| 2002/0190945 A1 | 12/2002 | Arita | |
| 2003/0057062 A1 * | 3/2003 | Inoue | H01H 25/041 |
| | | | 200/6 A |

(Continued)

FOREIGN PATENT DOCUMENTS

| | | |
|---|---|---|
| EP | 3 473 309 | 4/2019 |
| JP | 9-244802 | 9/1997 |

(Continued)

*Primary Examiner* — Peter J Iannuzzi
(74) *Attorney, Agent, or Firm* — NIXON & VANDERHYE, P.C.

(57) ABSTRACT

A controller as an example of an exemplary embodiment includes a housing including an opening, and an operation member, a part of which is exposed through the opening. The operation member includes a key top exposed through the opening and operated by a user, a shaft portion extending downward from the key top, and a protruding portion protruding from the shaft portion. Further, in the housing, a pedestal with which the protruding portion of the operation member comes into contact when the operation member is tilted is provided. The tilt of the operation member is limited by the protruding portion coming into contact with the pedestal. Further, a sensor for detecting pressure is provided on the pedestal.

18 Claims, 21 Drawing Sheets

(56) References Cited

U.S. PATENT DOCUMENTS

| | | | |
|---|---|---|---|
| 2006/0061549 A1* | 3/2006 | Chen ..................... | G06F 3/0338 |
| | | | 345/157 |
| 2008/0004114 A1 | 1/2008 | McVicar et al. | |
| 2012/0142418 A1 | 6/2012 | Muramatsu | |
| 2012/0188156 A1 | 7/2012 | Takahashi | |
| 2012/0274563 A1 | 11/2012 | Olsson | |
| 2013/0098191 A1 | 4/2013 | Manullang | |
| 2014/0251070 A1 | 9/2014 | Kornelson | |
| 2016/0346680 A1 | 12/2016 | Tsai | |
| 2016/0346681 A1 | 12/2016 | Tsai | |
| 2017/0304717 A1 | 10/2017 | Huang | |
| 2017/0354895 A1 | 12/2017 | Dornbusch | |
| 2017/0368451 A1 | 12/2017 | Tiffany et al. | |
| 2017/0368452 A1 | 12/2017 | Tiffany et al. | |
| 2018/0200617 A1 | 7/2018 | Tiffany et al. | |
| 2018/0356854 A1 | 12/2018 | Spiteri | |
| 2020/0209908 A1 | 7/2020 | Arita et al. | |

| | | |
|---|---|---|
| 2021/0113919 A1 | 4/2021 | Okamura et al. |

FOREIGN PATENT DOCUMENTS

| | | |
|---|---|---|
| JP | 2000-105666 | 4/2000 |
| JP | 2000-123690 | 4/2000 |
| JP | 2000-195381 | 7/2000 |
| JP | 2002-117750 | 4/2002 |
| JP | 2002-367488 | 12/2002 |
| JP | 2005-165608 | 6/2005 |
| JP | 2008-200140 | 9/2008 |
| JP | 2014-061225 | 4/2014 |
| JP | 2016-007345 | 1/2016 |
| JP | 6694196 | 5/2020 |
| JP | 2020-107178 A | 7/2020 |
| JP | 2020-523673 | 8/2020 |
| WO | 2018/224801 | 12/2018 |
| WO | 2018/229466 | 12/2018 |
| WO | WO 2019/169086 A1 | 9/2019 |

* cited by examiner

F I G. 2
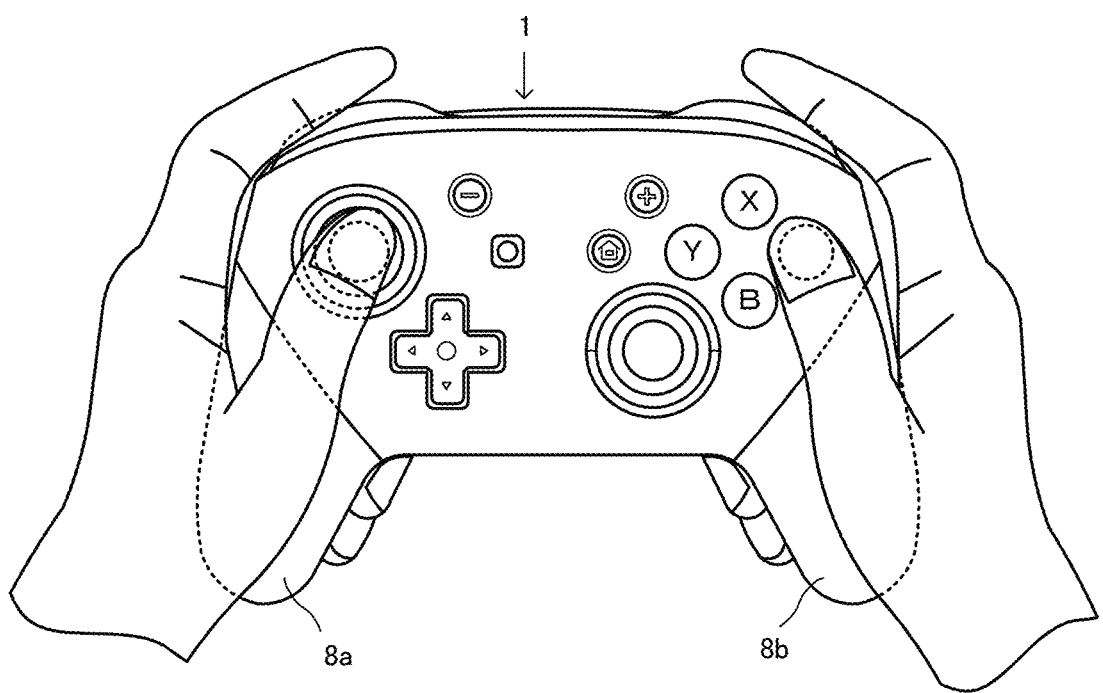

F I G.  3
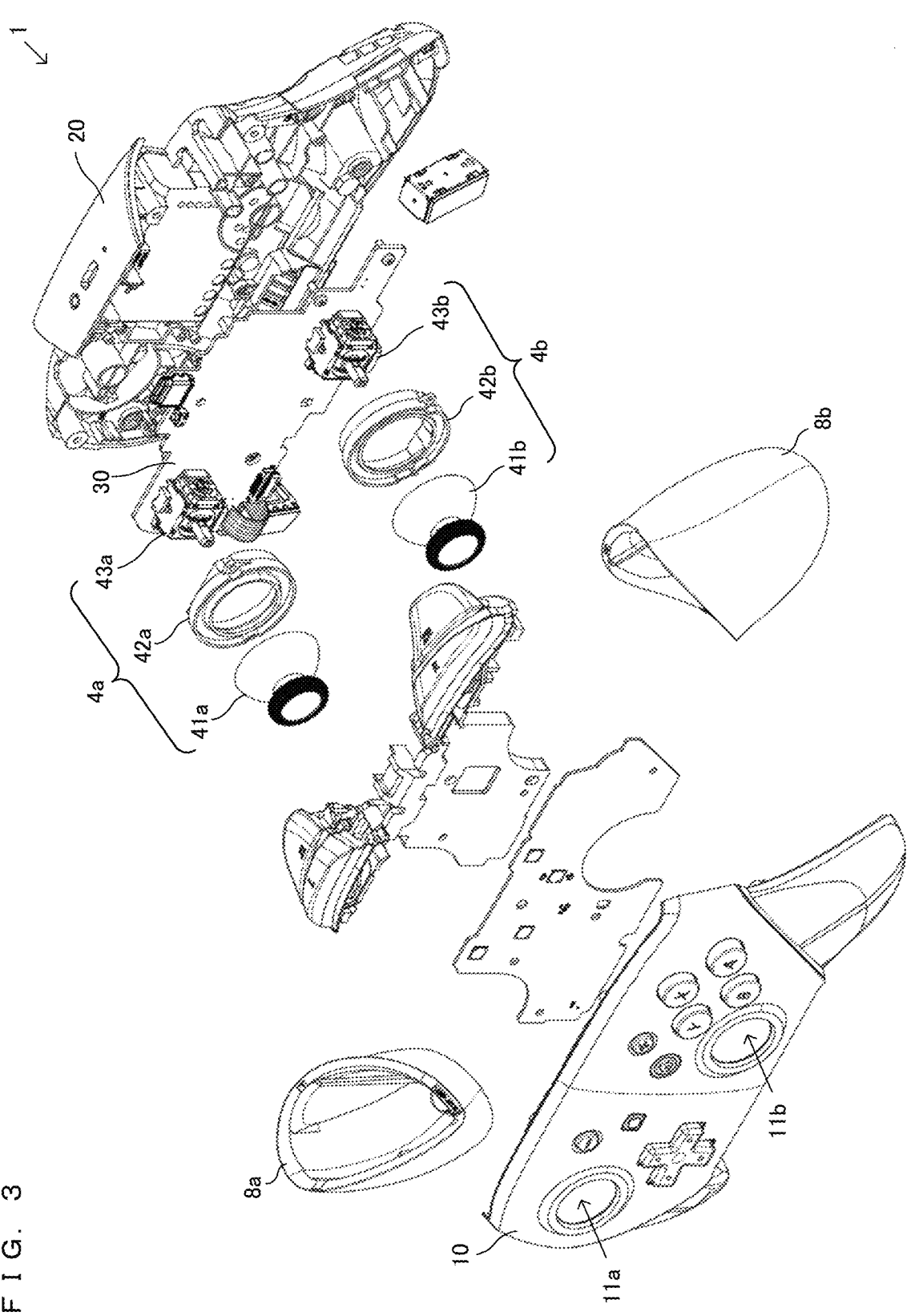

F I G. 4
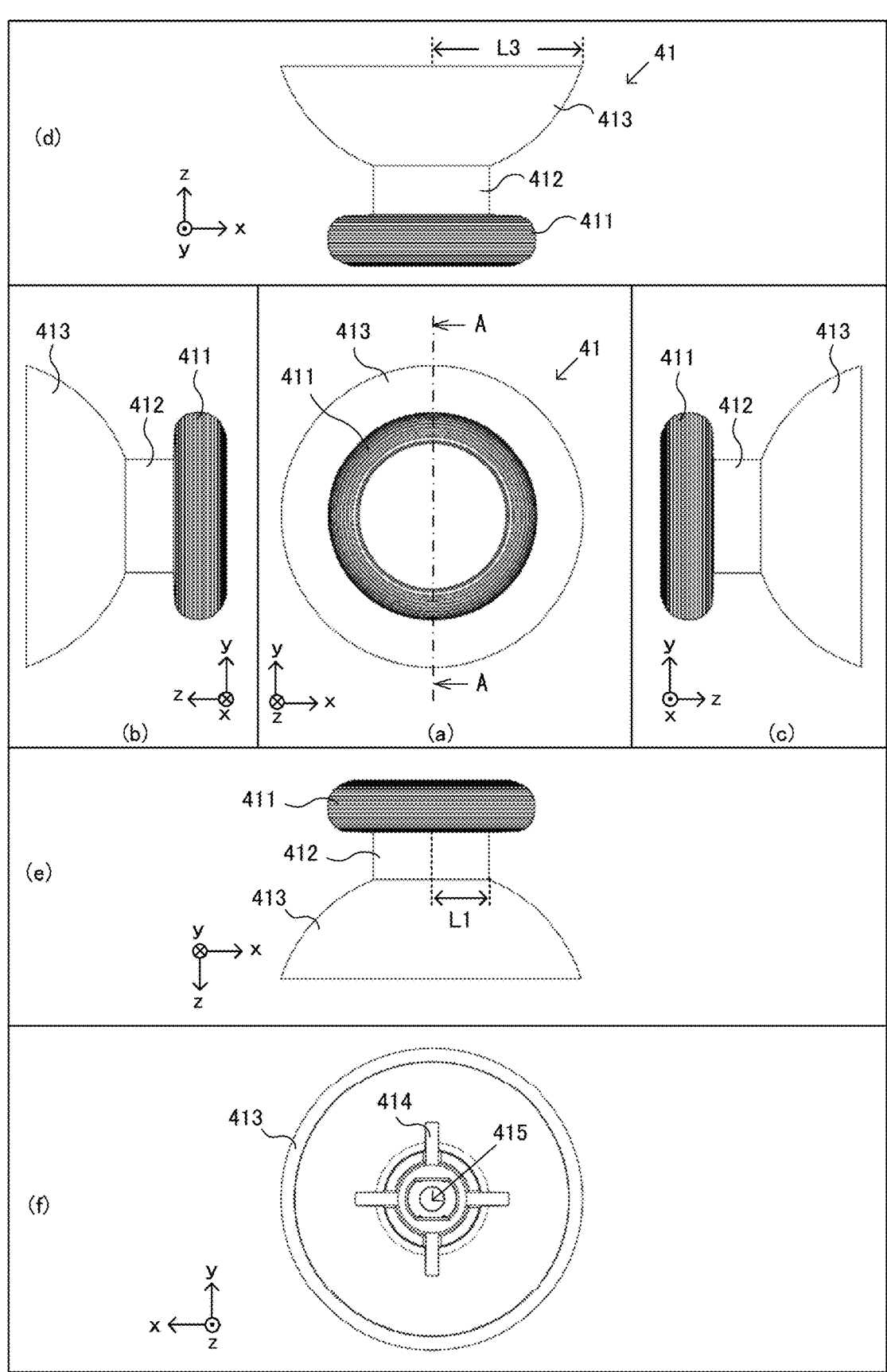

F I G. 5 A
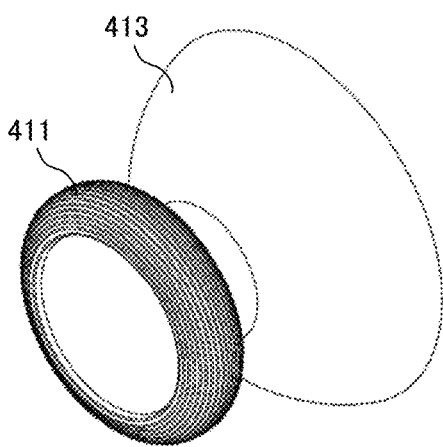
F I G. 5 B
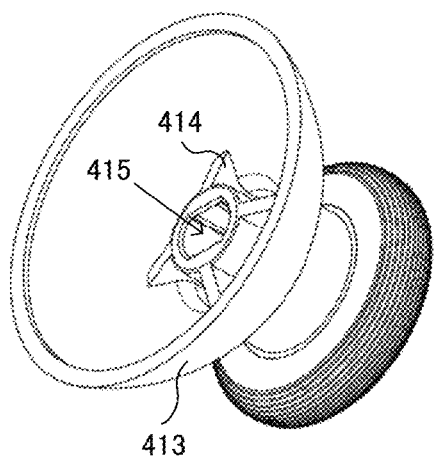
F I G. 6
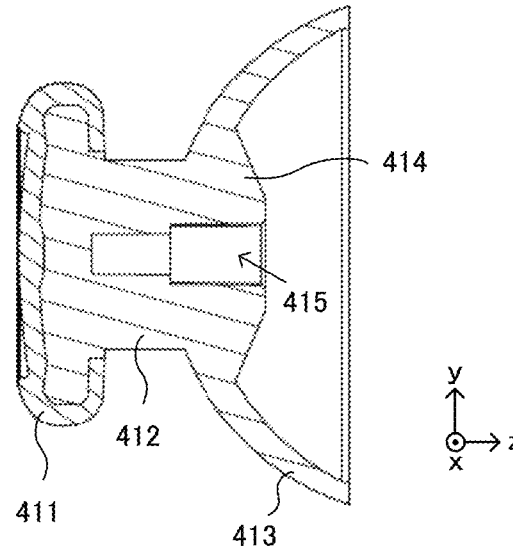

F I G.  7
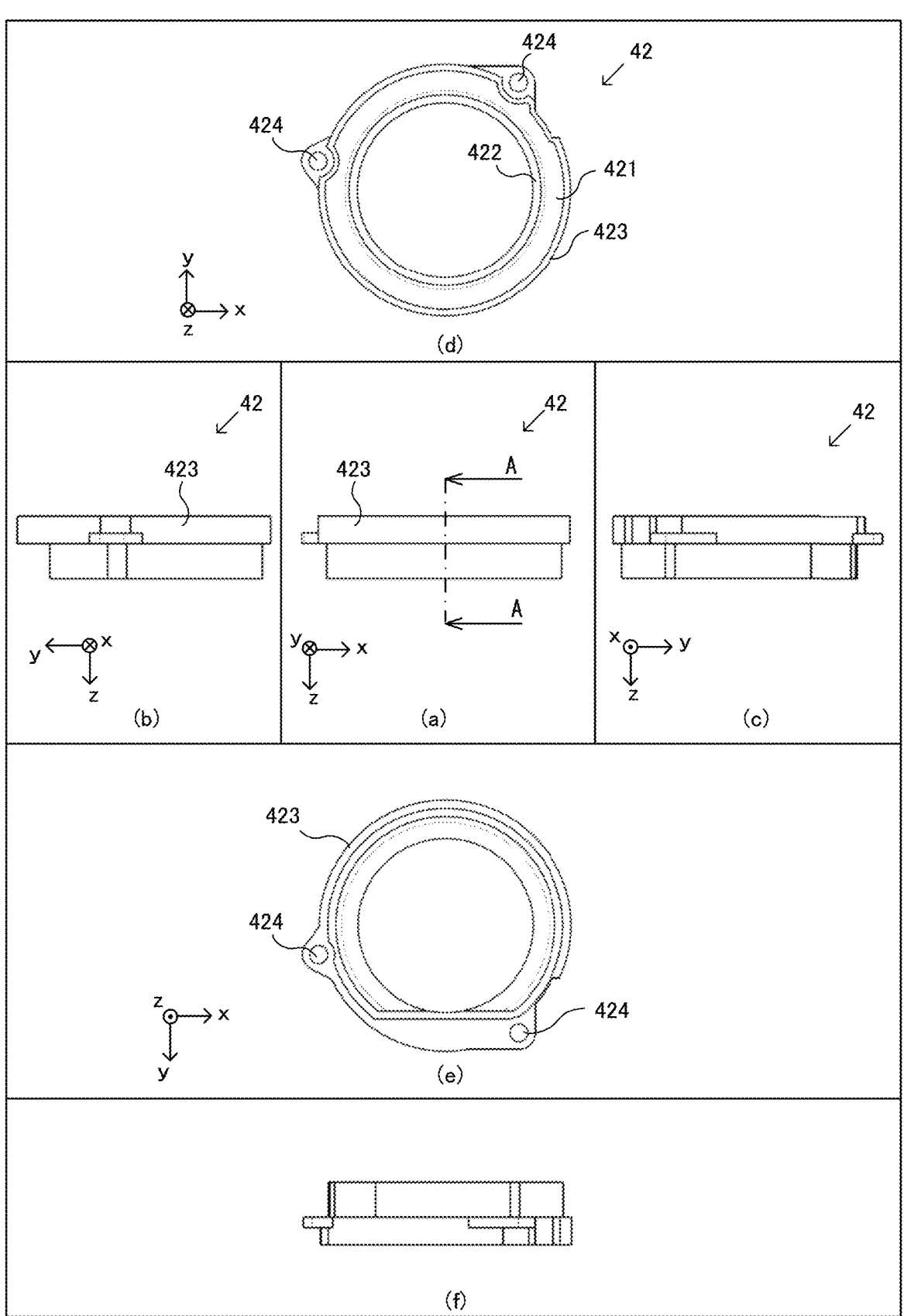

F I G.  8 A
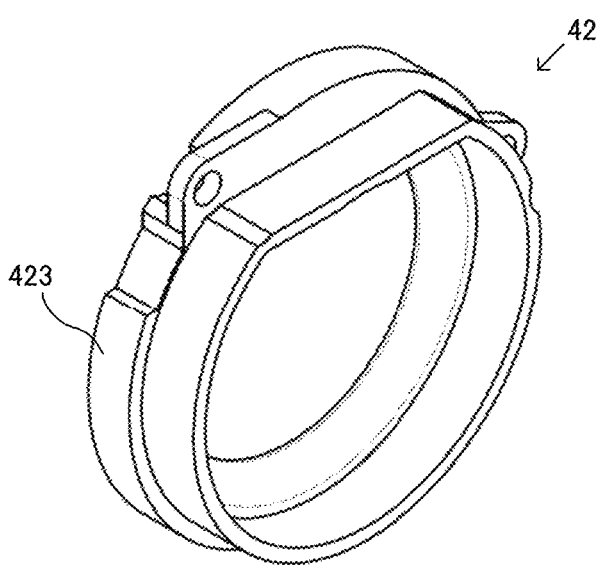
F I G.  8 B
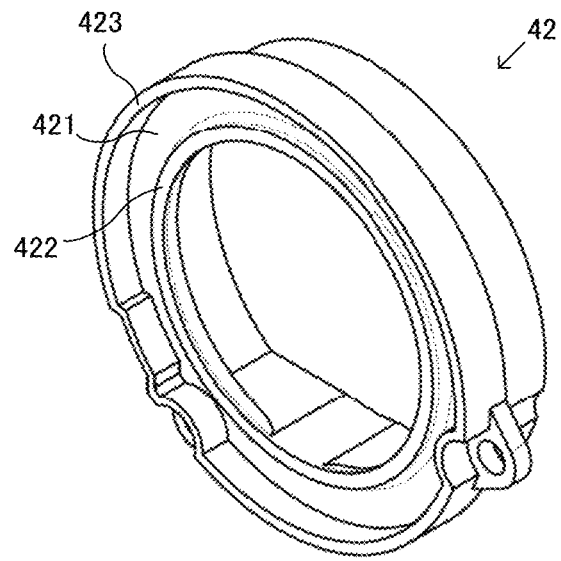
F I G.  9
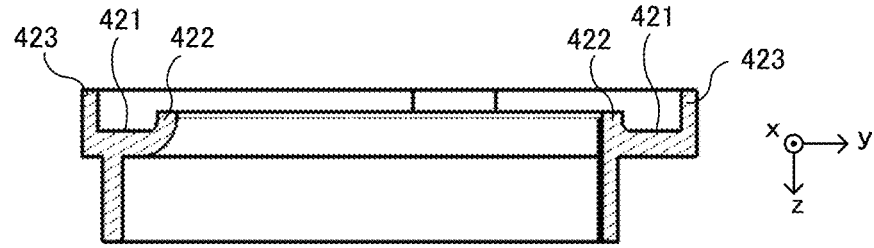

F I G.  1 2
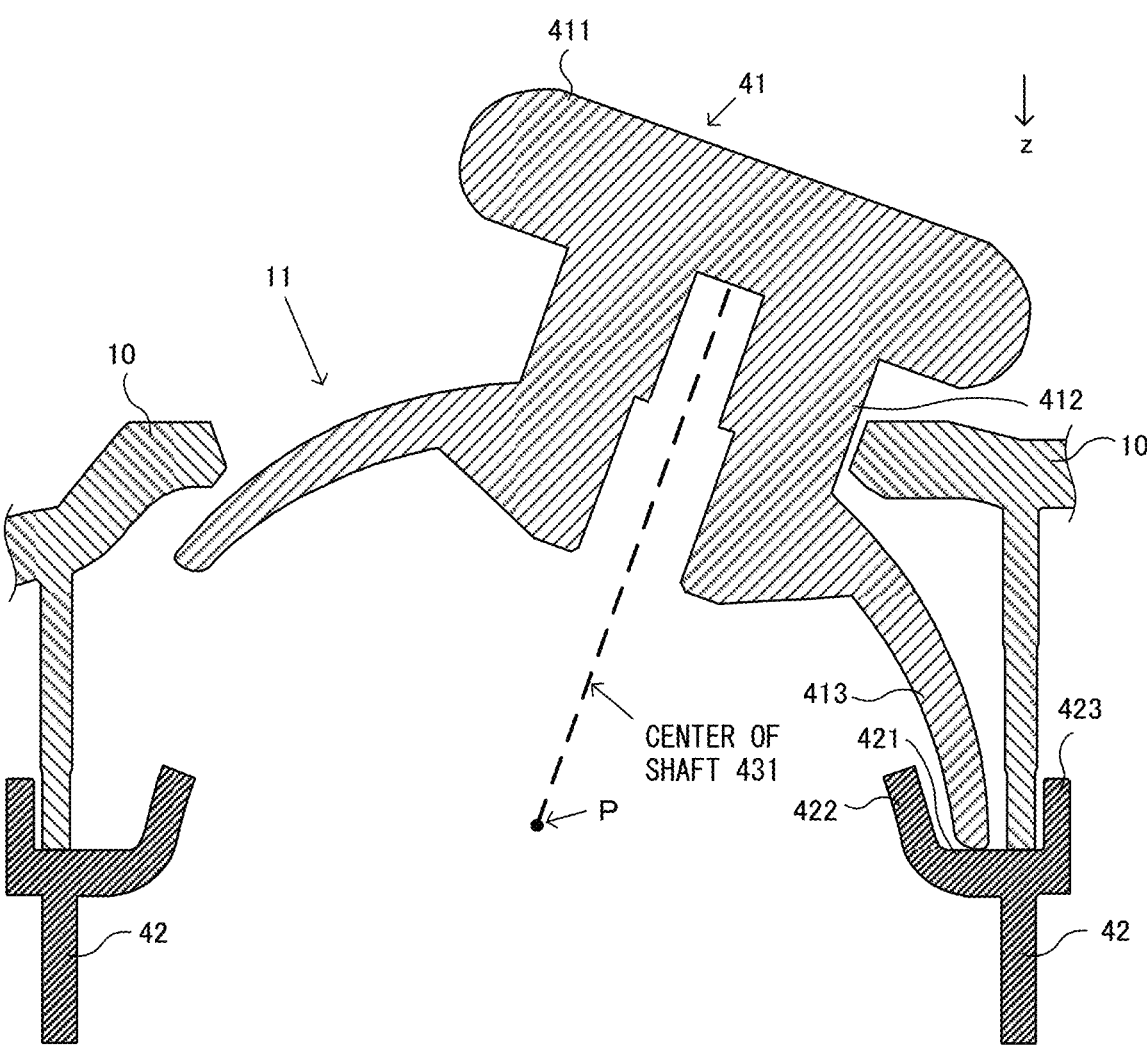

F I G.  1 3
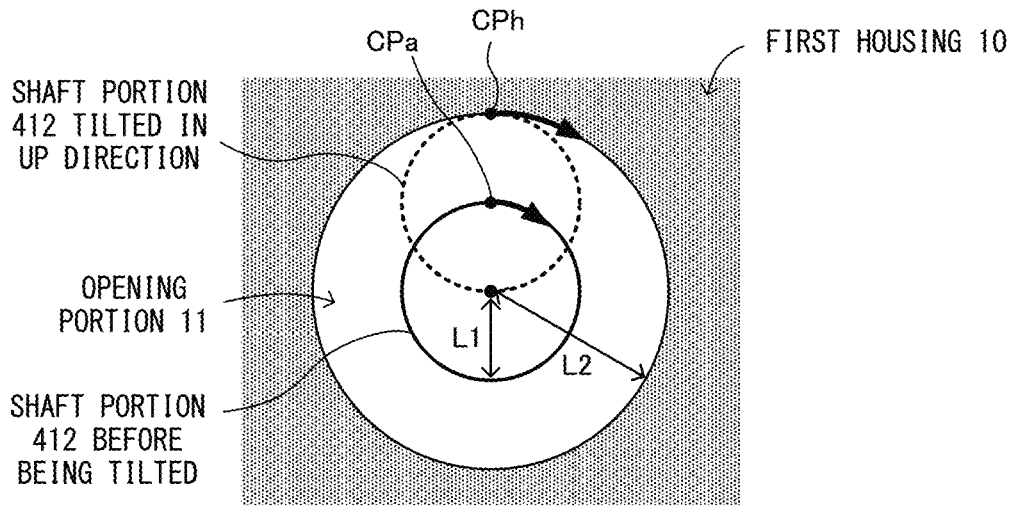
CPh
CPa
FIRST HOUSING 10
SHAFT PORTION 412 TILTED IN UP DIRECTION
OPENING PORTION 11
SHAFT PORTION 412 BEFORE BEING TILTED
L1
L2
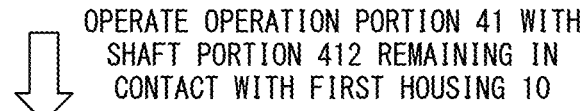
OPERATE OPERATION PORTION 41 WITH SHAFT PORTION 412 REMAINING IN CONTACT WITH FIRST HOUSING 10
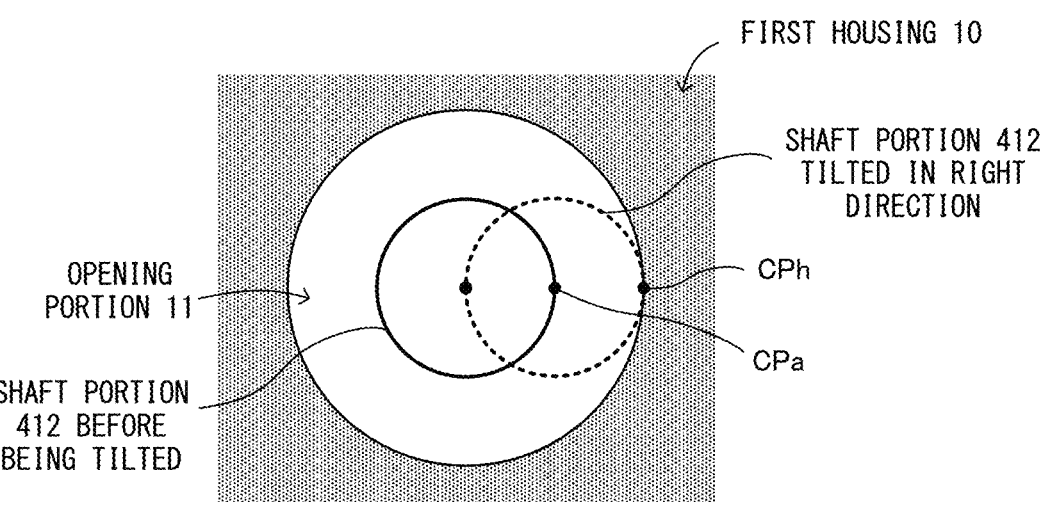
FIRST HOUSING 10
SHAFT PORTION 412 TILTED IN RIGHT DIRECTION
CPh
CPa
OPENING PORTION 11
SHAFT PORTION 412 BEFORE BEING TILTED F I G.   1 4
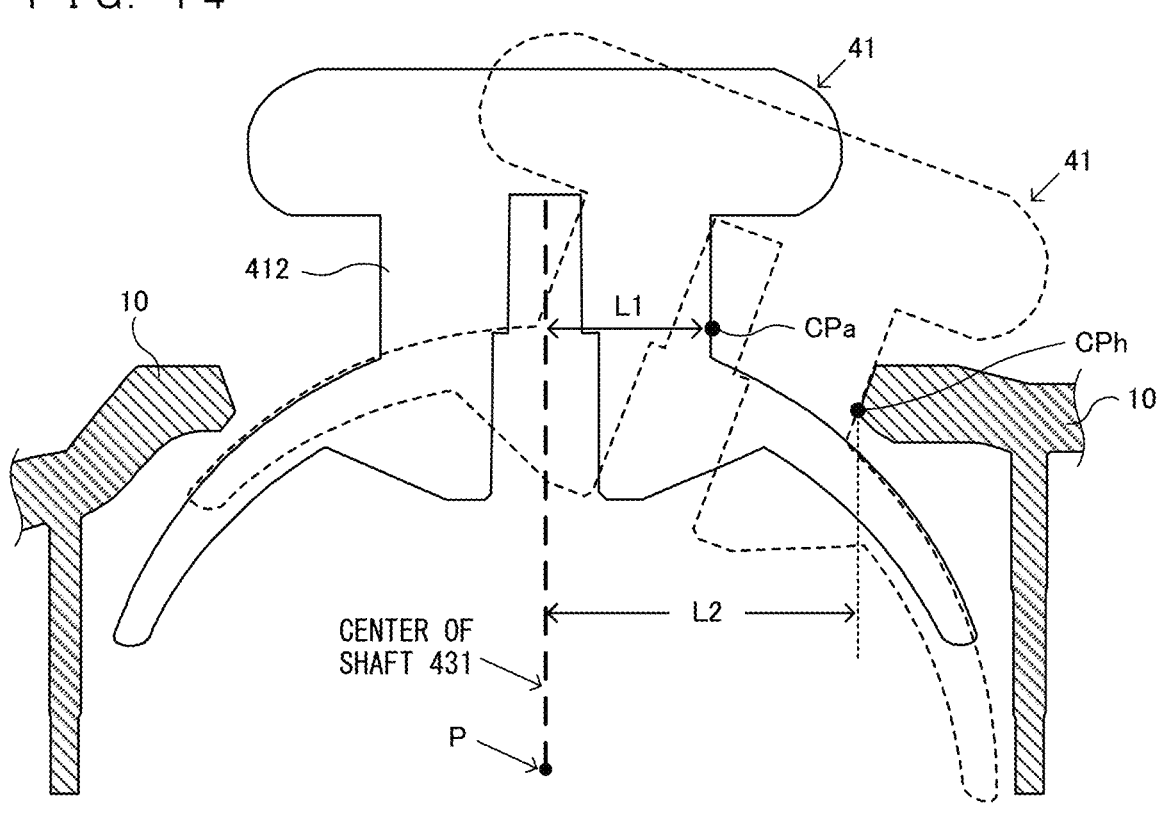
F I G.   1 5
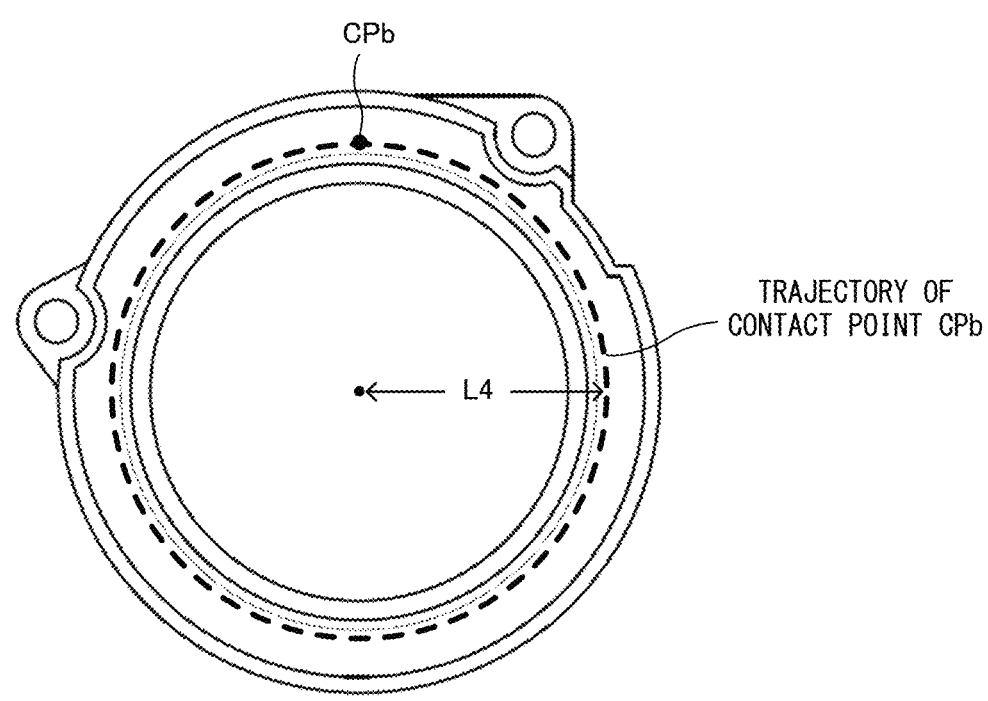

F I G.  1 6
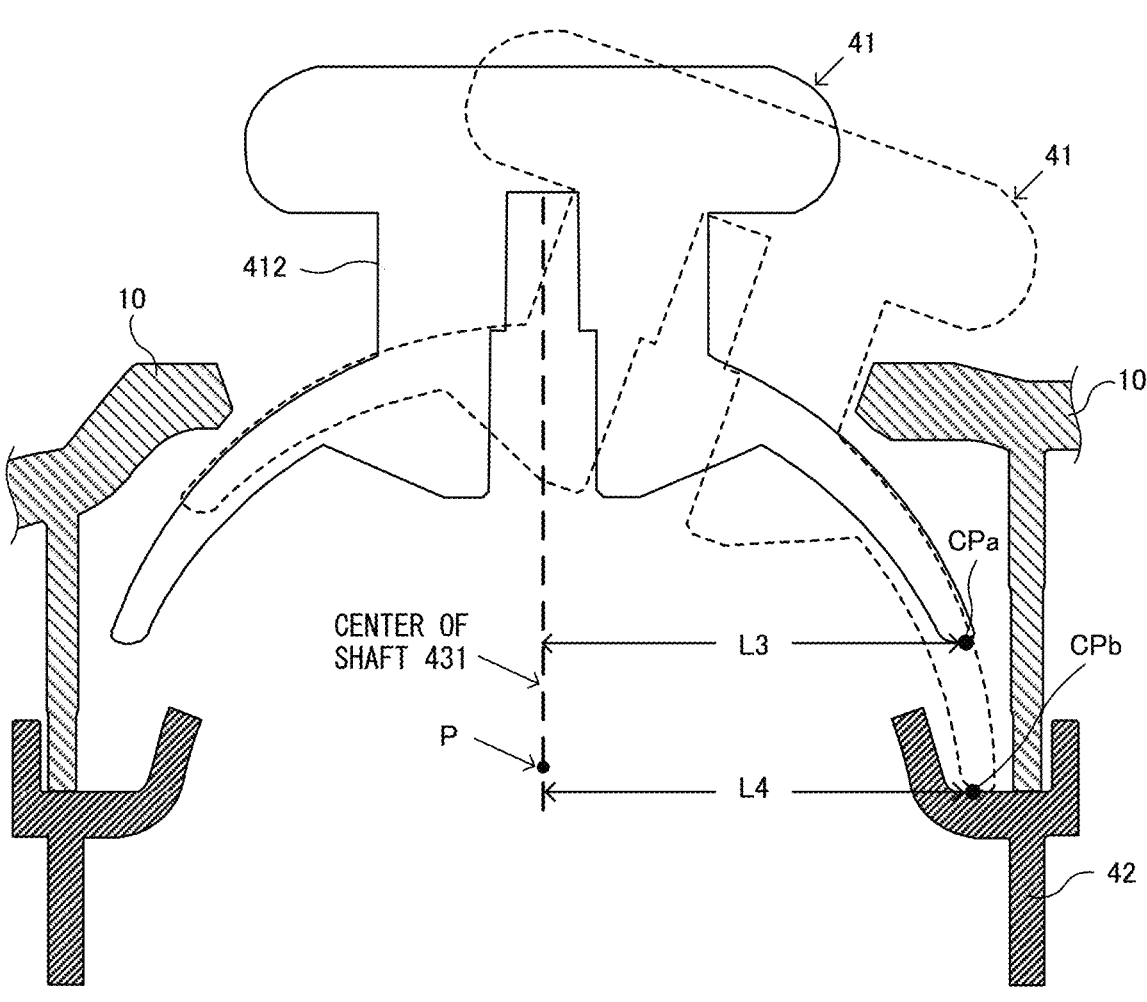

F I G .  1 7
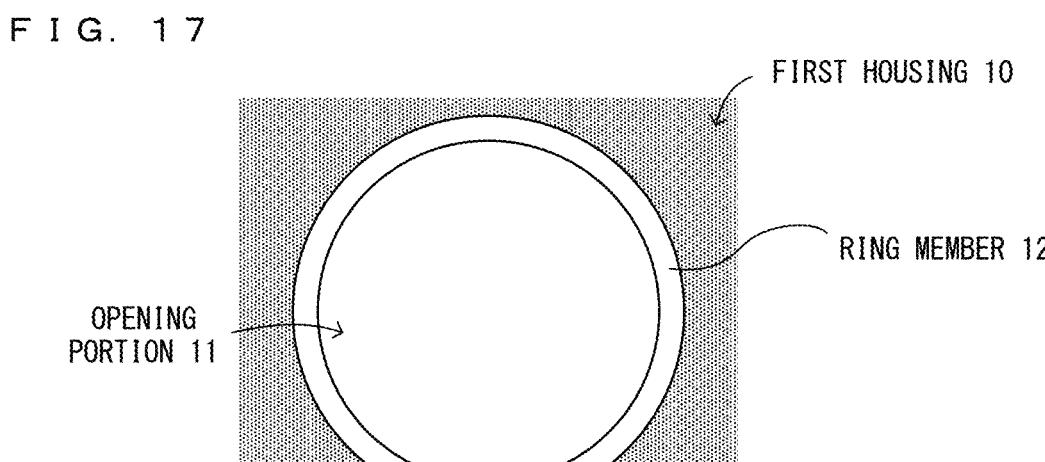
FIRST HOUSING 10
RING MEMBER 12
OPENING
PORTION 11
F I G .  1 8
411
41
11
412
12
10
12
10
413
423    421
422
423
413
421
422
42
CENTER OF
SHAFT 431
P
42
42

F I G.  1 9
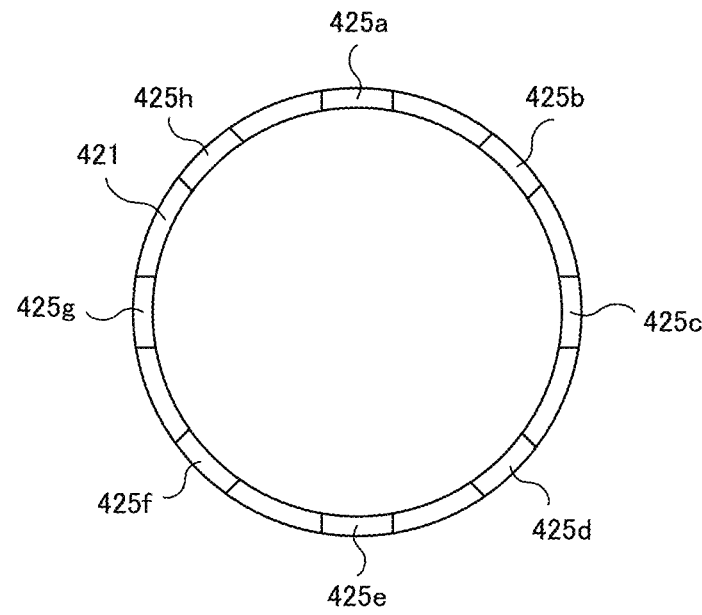
F I G.  2 0
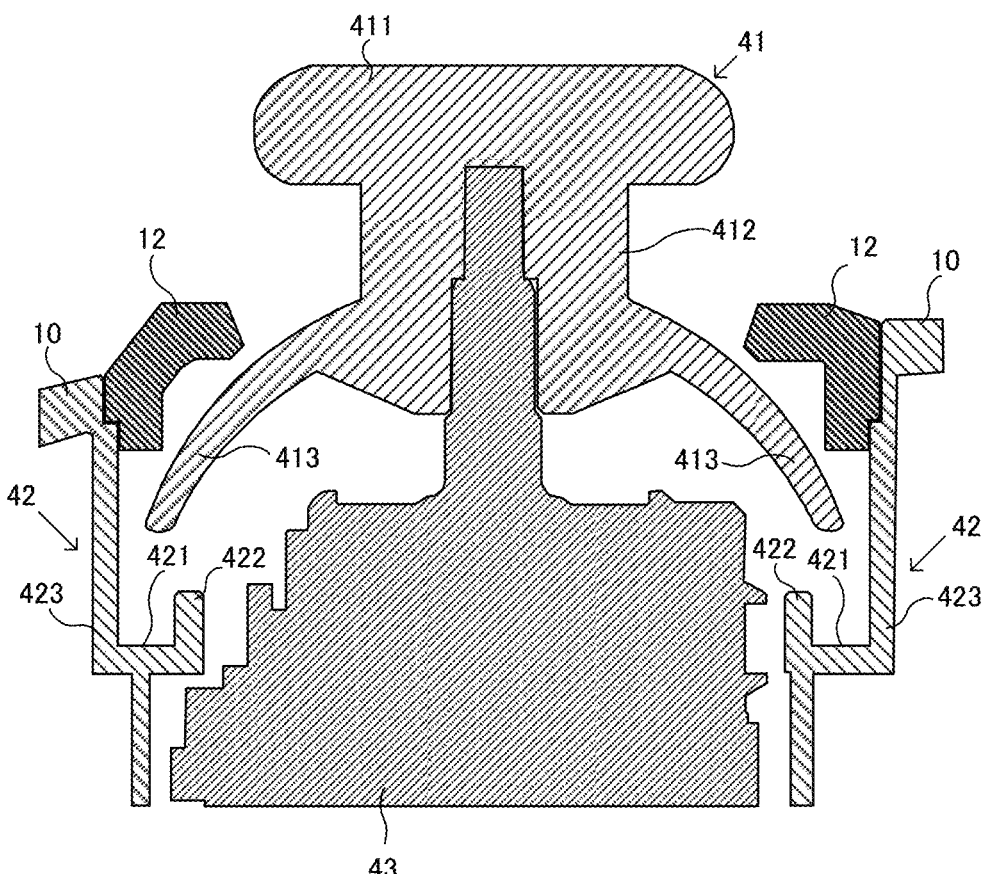

F I G.  2 1
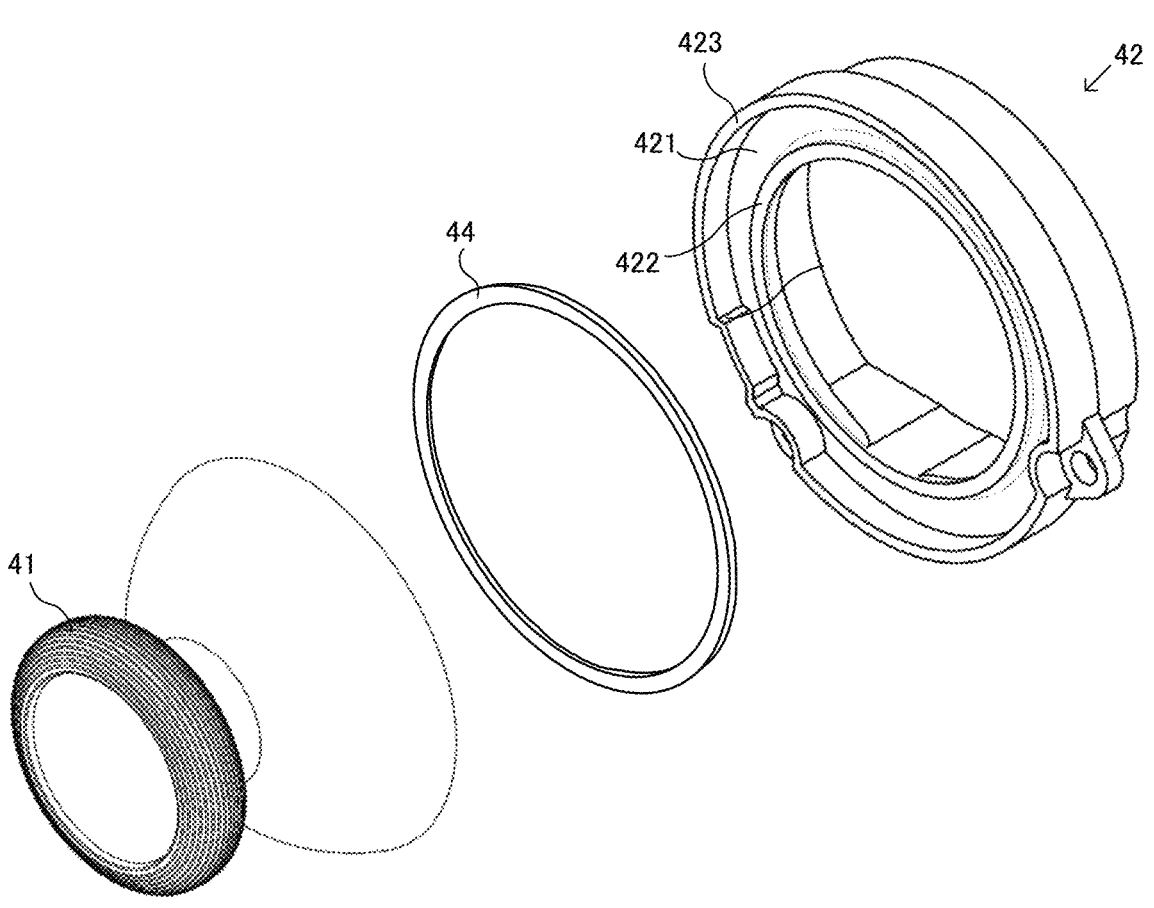

F I G . 2 2
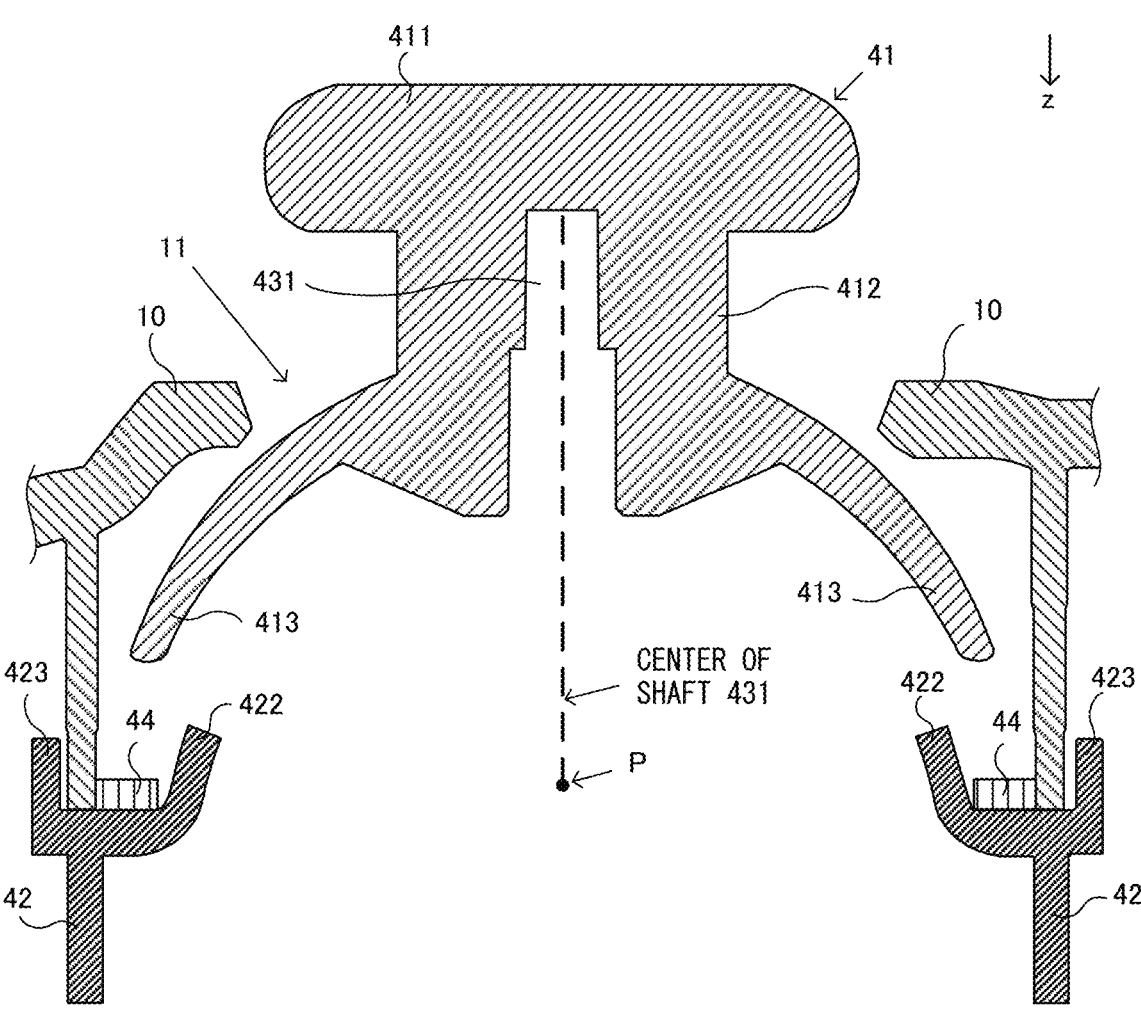

F I G. 2 3
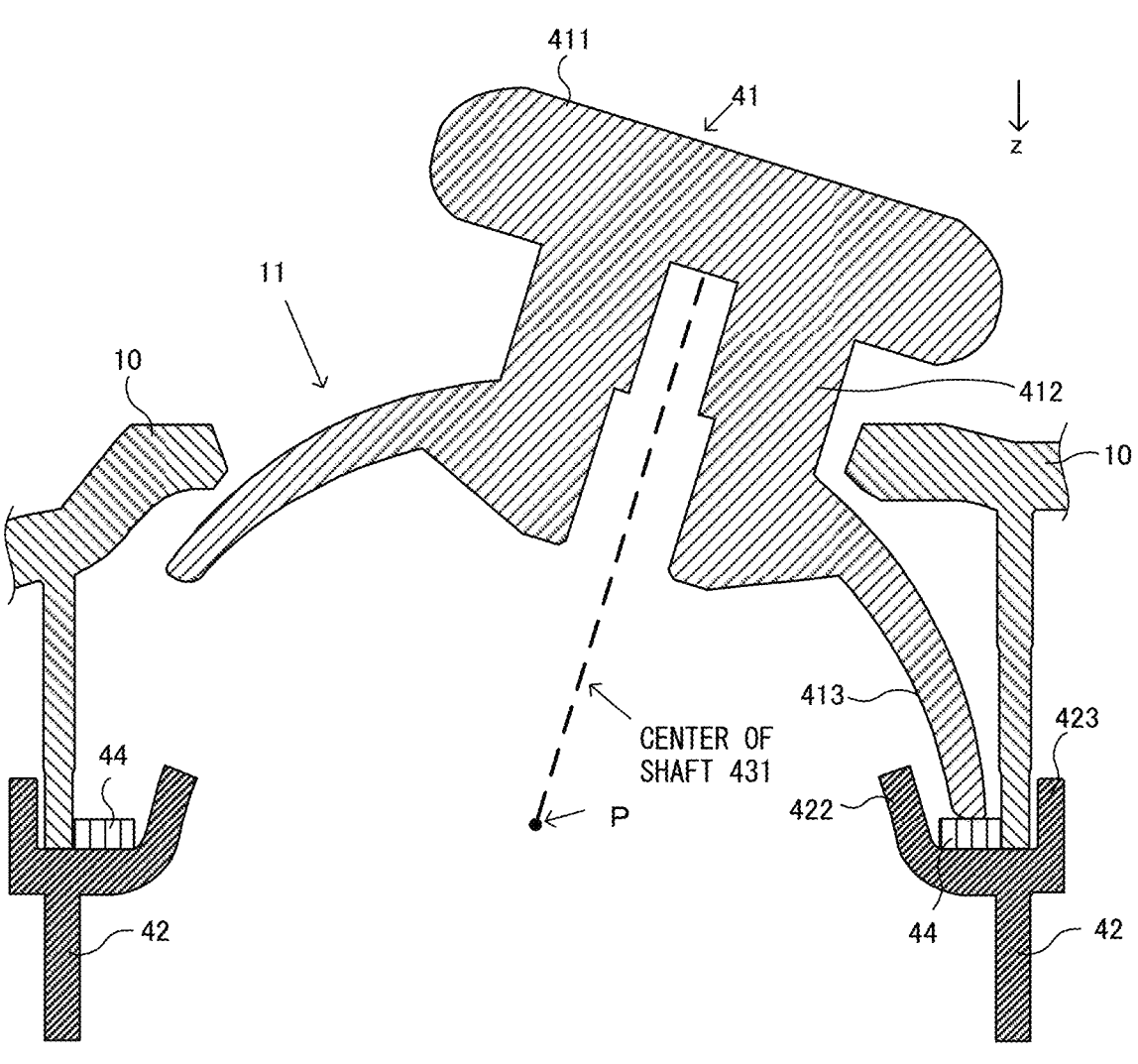

INPUT DEVICE, GAME CONTROLLER, AND INFORMATION PROCESSING APPARATUS

CROSS REFERENCE TO RELATED APPLICATION

This application is a continuation of International Patent Application No. PCT/JP2020/47300 filed on Dec. 17, 2020, the entire contents of which is incorporated herein by reference.

FIELD

An exemplary embodiment relates to an input device, a game controller, and an information processing apparatus.

BACKGROUND AND SUMMARY

Conventionally, there is a game controller including a multi-directional input section. For example, the conventional controller includes an analog stick as a multi-directional input section. The analog stick is exposed through an opening provided in a housing of the controller and is operated by a user.

Therefore, it is an object of an exemplary embodiment to provide a new technique for detecting an operation on an operation member.

To achieve the above object, the exemplary embodiment employs the following configurations.

An example of the exemplary embodiment is an input device comprising a housing including an opening, and an operation member, a part of which is exposed through the opening and which is movable in a peripheral direction of the opening, the operation member including: a key top exposed through the opening and operated by a user; a shaft portion extending from the key top through the opening to inside the housing; and a first portion located inside the housing, the input device further comprising: a second portion which is within the housing, and when the operation member moves in the peripheral direction of the opening, limits the movement by the first portion coming into contact with the second portion; and a first sensor that is at the first portion or the second portion and provides an output relating to a force applied due to the contact between the first portion and the second portion.

Based on the above, when an operation member moves in a peripheral direction of an opening, a first portion of the operation member comes into contact with second portion within a housing, thereby limiting the motion of the operation member. Further, a sensor that provides an output relating to a force applied due to the contact between the first portion and the second portion is included. Thus, it is possible to provide an input using the output of the sensor.

Further, in another configuration, the input device may further include a second sensor that detects a moving direction of the operation member.

Further, in another configuration, the first portion and the second portion may come into contact with each other through the first sensor.

Further, in another configuration, the first portion may protrude in a direction away from a center of the shaft portion and in an inward direction of the housing.

Further, in another configuration, when the operation member moves in the peripheral direction of the opening, an extremity of the first portion may come into contact with the second portion.

Further, in another configuration, the extremity of the first portion may have a round shape.

Further, in another configuration, when the operation member moves in a first direction, the first portion and the second portion may come into contact with each other at a position in the first direction.

Further, in another configuration, the second portion may include a contact surface with which the first portion comes into contact, and a wall portion extending from the contact surface in an outward direction of the housing.

Further, in another configuration, the wall portion may be in an end portion, on a center side of the shaft portion, of the contact surface.

Further, in another configuration, the second portion may be formed of a material having a lower coefficient of friction than at least a peripheral portion of the opening in the housing.

Further, in another configuration, when the operation member moves in the peripheral direction of the opening, the first portion may come into contact with the second portion without the shaft portion coming into contact with the housing.

Further, in another configuration, when the operation member moves in the peripheral direction of the opening, the first portion may come into contact with the second portion, and then, the operation member may further move in the peripheral direction, whereby the shaft portion may come into contact with the housing.

Further, in another configuration, when the operation member moves in a first direction, the first portion and the second portion may come into contact with each other at a position in a second direction opposite to the first direction.

Further, in another configuration, the second portion may be on a back side of the housing, and when the operation member moves in the peripheral direction of the opening, the movement may be limited by an outer side surface of the first portion coming into contact with the second portion.

Further, in another configuration, even if the operation member moves in any peripheral direction of the opening, the first portion may come into contact with the second portion.

Further, in another configuration, a portion of the first portion that comes into contact with the second portion may have a circular shape, and a portion of the second portion that comes into contact with the first portion may have a circular shape.

Further, in another configuration, the input device may further include a cushioning material in a portion where the first portion and the second portion come into contact with each other.

Further, in another configuration, a difference between a length of a portion of the first portion that comes into contact with the second portion and a length of a portion of the second portion that comes into contact with the first portion may be smaller than a difference between a perimeter of the shaft portion and a perimeter of the opening.

Further, in another configuration, a game controller may include the operation member, the second portion, and the sensor. Further, in another aspect, an information processing apparatus may include the input device.

According to the exemplary embodiment, it is possible to detect an operation on an operation member using a non-conventional technique.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 2 is an example non-limiting diagram showing the state where a user holds the game controller 1 with both hands;

FIG. 3 is an example non-limiting exploded perspective view of the game controller 1;

FIG. 4 is example non-limiting external views of an operation member 41 of an analog stick 4;

FIG. 5A is an example non-limiting front surface side perspective view of the operation member 41;

FIG. 5B is an example non-limiting back surface side perspective view of the operation member 41;

FIG. 6 is an example non-limiting cross-sectional view along a line A-A in (a) of FIG. 4;

FIG. 7 is example non-limiting external views of a pedestal 42 of the analog stick 4;

FIG. 8A is an example non-limiting perspective view of the pedestal 42 when viewed from a back surface side;

FIG. 8B is an example non-limiting perspective view of the pedestal 42 when viewed from an upper surface side;

FIG. 9 is an example non-limiting cross-sectional view along a line A-A in (a) of FIG. 7;

FIG. 12 is an example non-limiting diagram showing an example of the state where the operation member 41 is tilted in a right direction from the state of FIG. 10;

FIG. 13 is an example non-limiting diagram showing an example of the state where contact points move when the tilt of the operation member 41 is limited by the contact between a shaft portion 412 of the operation member 41 and a first housing 10;

FIG. 14 is an example non-limiting diagram showing an example of the state where the shaft portion 412 of the operation member 41 and the first housing 10 come into contact with each other in a configuration in which the pedestal 42 is not provided;

FIG. 15 is an example non-limiting diagram showing an example of the trajectory of a contact point when the tilt of the operation member 41 is limited by the contact between a protruding portion 413 of the operation member 41 and the pedestal 42;

FIG. 16 is an example non-limiting diagram showing an example of the state where the protruding portion 413 of the operation member 41 and the pedestal 42 come into contact with each other;

FIG. 17 is an example non-limiting diagram showing an example of a partially enlarged view when a ring member 12 is provided in an opening portion 11 of the first housing 10;

FIG. 18 is an example non-limiting diagram showing an example of an end surface of the game controller 1 when cut in the center of the analog stick 4 in a configuration in which the ring member 12 is provided in the periphery of the opening portion 11 of the first housing 10;

FIG. 19 is an example non-limiting diagram showing an example of a contact surface 421 when recessed portions are formed on the contact surface 421 of the pedestal 42;

FIG. 20 is an example non-limiting diagram showing an example of the configuration of another exemplary embodiment;

FIG. 21 is an example non-limiting exploded perspective view showing a part of the analog stick 4 of the game controller according to the exemplary embodiment;

FIG. 22 is a diagram showing an example of an end surface of the game controller according to the exemplary embodiment when cut in the center of the analog stick 4;

FIG. 23 is an example non-limiting diagram showing an example of the end surface when the operation member 41 is tilted in the right direction;

DETAILED DESCRIPTION OF NON-LIMITING EXAMPLE EMBODIMENTS

With reference to the drawings, a game controller 1 (an example of an input device) according to an exemplary embodiment is described below. The game controller 1 according to the exemplary embodiment is connected to a game apparatus (not shown) in a wireless or wired manner and used to perform an operation in a game performed in the game apparatus. It should be noted that the game apparatus to which the game controller 1 is connected may be a mobile game apparatus or may be a stationary game apparatus. Further, the game controller 1 may be connected not only to a game apparatus but also to an information processing apparatus such as a smartphone, a tablet terminal, or a personal computer and used to perform an operation in a game performed using the information processing apparatus.

Figure 1:
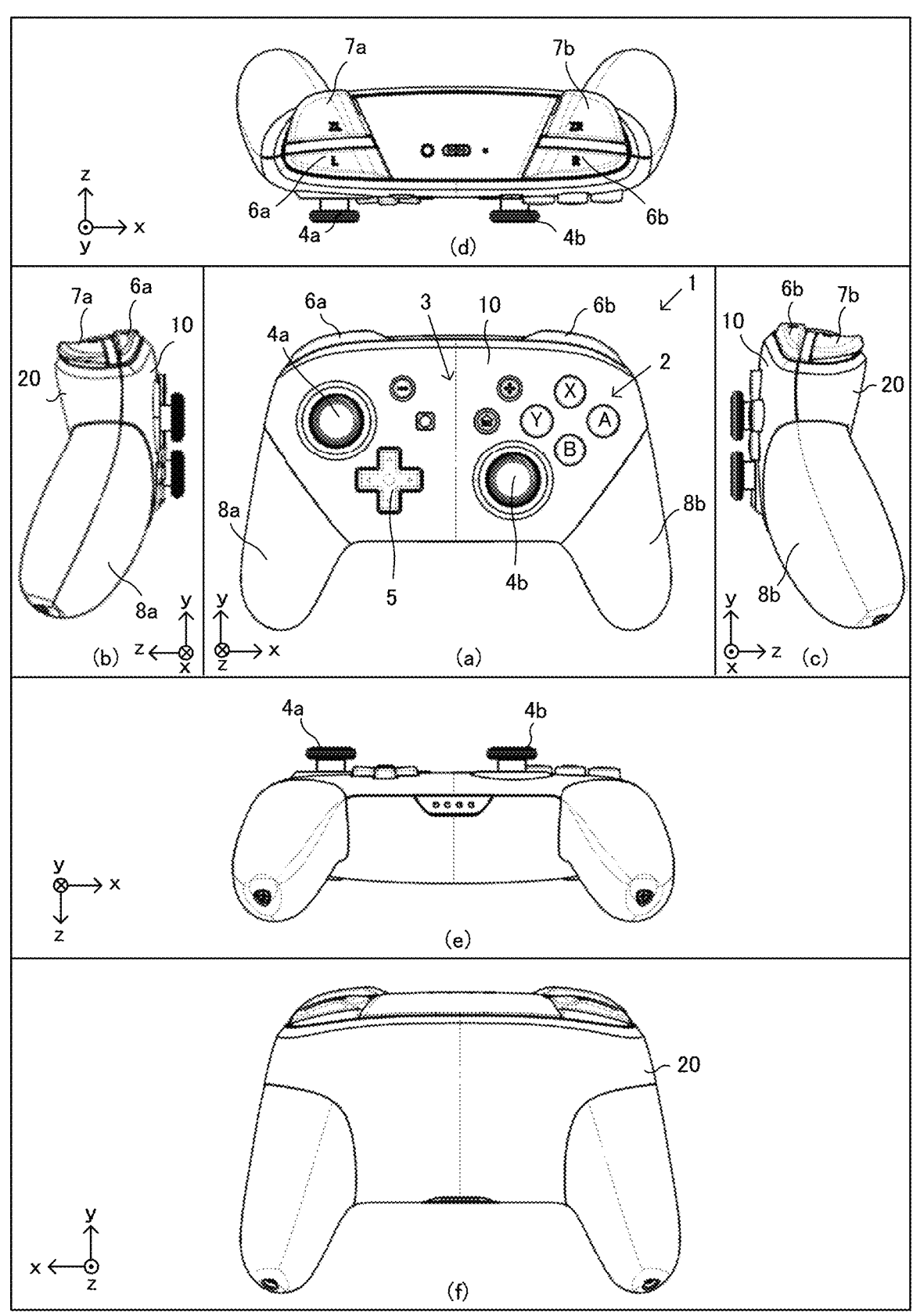
FIG. 1 is example non-limiting external views of a game controller 1.

FIG. 1 is examples of external views of the game controller 1. (a) of FIG. 1 is a front view of the game controller 1. (b) of FIG. 1 is a left side view of the game controller 1. (c) of FIG. 1 is a right side view of the game controller 1. (d) of FIG. 1 is a top view of the game controller 1. (e) of FIG. 1 is a bottom view of the game controller 1. (f) of FIG. 1 is a rear view of the game controller 1. An xyz coordinate system in FIG. 1 is a coordinate system based on the game controller 1. The xyz coordinate system defines a direction perpendicular to a front surface of the game controller 1 (e.g., the direction in which buttons 2 are pressed) as a z-axis direction, defines a left-right direction of the game controller 1 (e.g., the direction in which an A-button 2 and a Y-button 2 are connected together) as an x-axis direction, and defines an up-down direction of the game controller 1 (e.g., the direction in which a B-button 2 and an X-button 2 are connected together) as a y-axis direction.

As shown in FIG. 1, the game controller 1 includes a first housing 10 on the front surface side of the game controller 1 and a second housing 20 on a back surface side of the game controller 1. The first housing 10 and the second housing 20 are connected together, thereby forming a housing of the game controller 1. The first housing 10 and the second housing 20 may be formed of, for example, an ABS resin, a polycarbonate ABS resin, an acrylic ABS resin, or the like, or may be formed of a polymer alloy including at least two of these three materials. Further, the game controller 1 includes a left grip portion 8a and a right grip portion 8b.

Further, as shown in FIG. 1, in a right region of the front surface of the game controller 1, four buttons (an A-button, a B-button, an X-button, and a Y-button) 2 are provided. Further, to the left side of the four buttons 2, four buttons (a "+" button, a "−" button, a home button, and a capture button) 3 are provided. Further, in the right region of the front surface of the game controller 1 and obliquely below and to the left of the Y-button 2, a right analog stick 4b is provided.

Further, in a left region of the front surface of the game controller 1 and to the left side of the "−" button 3, a left analog stick 4a is placed. Further, in the left region of the front surface of the game controller 1 and obliquely below and to the right of the left analog stick 4a, a directional pad 5 is placed.

Further, as shown in (d) of FIG. 1, on an upper surface of the game controller 1, an L-button 6a, a ZL-button 7a, an R-button 6b, and a ZR-button 7b are provided. Specifically, the L-button 6a is provided in a left end portion on the upper surface of the game controller 1. The ZL-button 7a is provided on the back surface side of the game controller 1 (further in a positive z-axis direction) of the L-button 6a. Further, the R-button 6b is provided in a right end portion on the upper surface of the game controller 1. The ZR-button 7b is provided on the back surface side of the game controller 1 (further in the positive z-axis direction) of the R-button 6b.

The four buttons 2 are buttons that can be pressed in a depth direction (the positive z-axis direction) in (a) of FIG. 1, and are buttons used for a game operation. Further, the four buttons 3 are buttons that can be pressed in the positive z-axis direction. Further, the directional pad 5 is a device for indicating up, down, left, and right directions.

Further, the left analog stick 4a and the right analog stick 4b are devices for indicating directions and are each configured such that a key top of the analog stick to be operated by the finger of a user can be tilted in any directions (at any angles in up, down, left, right, and oblique directions). The left analog stick 4a and the right analog stick 4b may be configured to be pressed in the positive z-axis direction. It should be noted that hereinafter, the left analog stick 4a and the right analog stick 4b will occasionally be collectively referred to as an "analog stick 4". The analog stick 4 outputs a signal including information regarding the direction in which the analog stick 4 is tilted, and information regarding the angle of the tilt. The game apparatus can execute game processing based on this signal. The details of the analog stick 4 will be described later.

FIG. 2 is a diagram showing the state where the user holds the game controller 1 with both hands. As shown in FIG. 2, when the user holds the grip portion 8a with their left hand and holds the grip portion 8b with their right hand, the user can operate the left analog stick 4a and the directional pad 5 with the thumb of the left hand. Further, the user can operate two of the buttons 3 (the "−" button and the capture button) with the thumb of the left hand. Further, the user can operate the L-button 6a and the ZL-button 7a with the index finger (or the middle finger) of the left hand. Further, the user can operate the four buttons 2 (the A-button, the B-button, the X-button, and the Y-button), the right analog stick 4b, and two of the buttons 3 (the "+" button and the home button) with the thumb of the right hand. Further, the user can operate the R-button 6b and the ZR-button 7b with the index finger (or the middle finger) of the right hand. It should be noted that FIG. 2 shows the typical manner of holding the game controller 1. The game controller 1 may be held in a different manner depending on the user.

First, a structure related to the limitation on the tilt of the analog stick is described below. FIG. 3 is an exploded perspective view of the game controller 1. As shown in FIG. 3, within the game controller 1 (within the housing formed of the first housing 10 and the second housing 20), various members are accommodated.

Specifically, within the game controller 1, a substrate 30, a left analog stick main body part 43a, a pedestal 42a, and a left operation member 41a are accommodated. Further, within the game controller 1, a right analog stick main body part 43b, a pedestal 42b, and a right operation member 41b are accommodated. It should be noted that although various parts are also accommodated within the game controller 1 in addition to these, only portions related to the analog stick 4 will be described below.

The left analog stick 4a is formed of the left analog stick main body part 43a, the pedestal 42a, and the left operation member 41a. Further, the right analog stick 4b is formed of the right analog stick main body part 43b, the pedestal 42b, and the right operation member 41b. It should be noted that hereinafter, the left analog stick main body part 43a and the right analog stick main body part 43b will occasionally be collectively referred to as an "analog stick main body part 43". Further, the pedestal 42a and the pedestal 42b will occasionally be collectively referred to as a "pedestal 42" (an example of a second portion). Similarly, the left operation member 41a and the right operation member 41b will occasionally be collectively referred to as an "operation member 41".

The analog stick main body part 43 is fixed onto the substrate 30. The analog stick main body part 43 includes a stick shaft 431 (see FIG. 10). Although the details will be described later, the stick shaft 431 of the analog stick main body part 43 is inserted into a shaft insertion opening 415 provided in the operation member 41, thereby fixing the operation member 41 to the analog stick main body part 43. Then, a key top of the operation member 41 is exposed through an opening portion 11 (a left opening portion 11a and a right opening portion 11b) provided in the first housing 10. The analog stick main body part 43 is a sensor that detects an input direction (the tilt direction of the operation member 41).

The operation member 41 is tilted by the user, thereby inputting a direction. Although the details will be described later, the tilt angle of the operation member 41 is limited by the pedestal 42.

(Details of Operation Member 41 of Analog Stick 4)

Next, the details of the operation member 41 of the analog stick 4 are described. FIG. 4 is examples of external views of the operation member 41 of the analog stick 4. (a) of FIG. 4 is a front view of the operation member 41 (a diagram in which only the operation member 41 is viewed from the front surface of the game controller 1 when the operation member 41 is fixed to the game controller 1). (b) of FIG. 4 is a left side view of the operation member 41. (c) of FIG. 4 is a right side view of the operation member 41. (d) of FIG. 4 is a top view of the operation member 41. (e) of FIG. 4 is a bottom view of the operation member 41. (f) of FIG. 4 is a rear view of the operation member 41. It should be noted that an x-axis, a y-axis, and z-axis in FIG. 4 correspond to the x-axis, the y-axis, and the z-axis, respectively, in FIG. 1.

FIG. 5A is a front surface side perspective view of the operation member 41.

FIG. 5B is a back surface side perspective view of the operation member 41. Further, FIG. 6 is a cross-sectional view along a line A-A in (a) of FIG. 4.

As shown in FIG. 4, the operation member 41 includes a key top 411, a shaft portion 412, and a protruding portion 413. The key top 411 is exposed through the opening portion 11 of the first housing 10 and is a portion to be operated (touched) by the user. The shape of the key top 411 is a circular shape when the game controller 1 is viewed from the front surface.

The shaft portion 412 extends downward from the key top 411 (in the direction in which the buttons 2 of the game controller 1 are pressed; the positive z-axis direction). When the operation member 41 is provided in the game controller 1, the shaft portion 412 extends in the direction from the key top 411 toward the inside of the housing of the game controller 1. The shaft portion 412 has, for example, a columnar shape, and the radius of a bottom surface of the shaft portion 412 is L1. When the operation member 41 is fixed to the analog stick main body part 43 provided on the substrate 30, the shaft portion 412 penetrates through the opening portion 11 of the first housing 10 and exposes the key top 411 to the outside of the housing.

The protruding portion 413 (an example of a first portion) is formed into an umbrella shape and formed such that the further downward (the positive z-axis direction) in the shaft portion 412, the wider. The protruding portion 413 is a contact portion that comes into contact with the pedestal 42 when the operation member 41 is tilted. The protruding portion 413 and the pedestal 42 may come into direct contact with each other, or may come into contact with each other through a sheet described below. The protruding portion 413 and the pedestal 42 may come into contact with each other through a pressure sensor described below. That is, "the protruding portion 413 and the pedestal 42 come into contact with each other" may mean that the protruding portion 413 and the pedestal 42 come into direct contact with each other, or may mean that the protruding portion 413 and the pedestal 42 come into indirect contact with each other, for example, across another member. Specifically, the protruding portion 413 protrudes downward from the shaft portion 412 and in a direction away from the center of the shaft portion 412 (the x-axis direction and the y-axis direction, i.e., a direction perpendicular to the direction in which the buttons 2 are pressed). More specifically, as shown in (e) of FIG. 4, the protruding portion 413 has a shape obtained by cutting about half to two-thirds of a hollow ball. The side surface of the protruding portion 413 is arcuate when viewed from a direction parallel to the xy plane. As shown in (f) of FIG. 4, a lower end portion (extremity) of the protruding portion 413 is circular when the operation member 41 is viewed from the back surface. Further, the extremity of the protruding portion 413 may have a round shape. As shown in (d) of FIG. 4, the distance from the center of the shaft portion 412 to the extremity of the protruding portion 413 (i.e., the radius of the circle of the extremity of the protruding portion 413) is L3 (>L1). The extremity of the protruding portion 413 may not have a round shape, and may include a protrusion protruding in the side surface direction.

Further, as shown in (f) of FIGS. 4, 5B, and 6, inside the protruding portion 413, a plurality of ribs 414 are provided. The ribs 414 are provided along the inside of the protruding portion 413 toward the extremity of the protruding portion 413, thereby preventing the protruding portion 413 from deforming when the operation member 41 is operated. It should be noted that the ribs 414 may be provided so as to extend to the extremity of the protruding portion 413.

Further, inside the protruding portion 413, a shaft insertion opening 415 is provided. Into the shaft insertion opening 415, the stick shaft 431 of the analog stick main body part 43 (see FIG. 10) is inserted. Consequently, the operation member 41 is fixed to the analog stick main body part 43.

The key top 411 is formed of a different material from those of the first housing 10 and the second housing 20 and formed of a material having a higher coefficient of friction than the first housing 10 and the second housing 20 so that the key top 411 is less likely to slip when the user operates the key top 411. Further, the shaft portion 412 and the protruding portion 413 (also the ribs 414 and the shaft insertion opening 415) may be formed of polypropylene. Further, the shaft portion 412 and the protruding portion 413 may be formed of the same material as those of the first housing 10 and the second housing 20. The key top 411, the shaft portion 412, and the protruding portion 413 (also the ribs 414 and the shaft insertion opening 415) may be integrally molded by two-color molding. It should be noted that the key top 411 may be formed of the same material as that of the first housing 10. Further, the shaft portion 412 and the protruding portion 413 may be formed of different materials.

(Details of Pedestal 42 of Analog Stick 4)

FIG. 7 is examples of external views of the pedestal 42 of the analog stick 4. (a) of FIG. 7 is a front view of the pedestal 42. (b) of FIG. 7 is a left side view of the pedestal 42. (c) of FIG. 7 is a right side view of the pedestal 42. (d) of FIG. 7 is a top view of the pedestal 42. (e) of FIG. 7 is a bottom view of the pedestal 42. (f) of FIG. 7 is a rear view of the pedestal 42. It should be noted that a z-axis in FIG. 7 coincides with the z-axis in FIG. 1.

FIG. 8A is a perspective view of the pedestal 42 when viewed from the back surface side. FIG. 8B is a perspective view of the pedestal 42 when viewed from the upper surface side. Further, FIG. 9 is a cross-sectional view along a line A-A in (a) of FIG. 7.

The pedestal 42 (an example of the second portion) is a contact target portion that comes into contact with the protruding portion 413 when the operation member 41 is tilted. As shown in (d) of FIG. 7, the pedestal 42 is a ring-shaped member. The pedestal 42 includes a contact surface 421, an inner wall 422, and an outer wall 423. Further, the pedestal 42 includes two screw holes 424. The pedestal 42 is molded by integral molding. Screws are inserted into the screw holes 424, and the pedestal 42 is screwed, thereby fixing the pedestal 42 to the first housing 10. The pedestal 42 is fixed in the housing such that the contact surface 421 is directed to the front surface side of the game controller 1 (i.e., the normal vector of the contact surface 421 is directed in a negative z-axis direction of the game controller 1). As shown in FIG. 3, the pedestal 42 is disposed further on the front surface side of the game controller 1 than the substrate 30 and the analog stick main body part 43, and the ring-shaped pedestal 42 is disposed so as to surround the analog stick main body part 43.

As shown in FIG. 9, the contact surface 421 is a flat surface parallel to the xy plane. The outer wall 423 is a surface that extends upward (in the negative z-axis direction) from the contact surface 421 and for example, is perpendicular to the contact surface 421. Further, at least a surface inside the inner wall 422 (a surface that comes into contact with the contact surface 421) is formed, for example, so as to extend upward (in the negative z-axis direction) and toward the center (inside) of the pedestal 42 from the contact surface 421 and have an angle greater than the 90 degrees with respect to the contact surface 421. It should be noted that at least either one of the inner wall 422 and the outer wall 423 may not be formed.

The pedestal 42 may be formed of a material having higher sliding properties (a lower coefficient of friction) than the first housing 10 and the second housing 20. Further, the pedestal 42 may be formed of a material having higher sliding properties than the protruding portion 413 of the operation member 41. For example, the pedestal 42 may be formed of a POM (polyacetal) resin, a PA (nylon/polyamide) resin, a PBT resin, or the like. It should be noted that the pedestal 42 may be formed of any material. For example, the pedestal 42 may be formed of the same material as that of the protruding portion 413, or may be formed of the same material as those of the first housing 10 and the second housing 20.

(Limitation on Tilt of Operation Member 41 by Pedestal 42)

Figure 10:
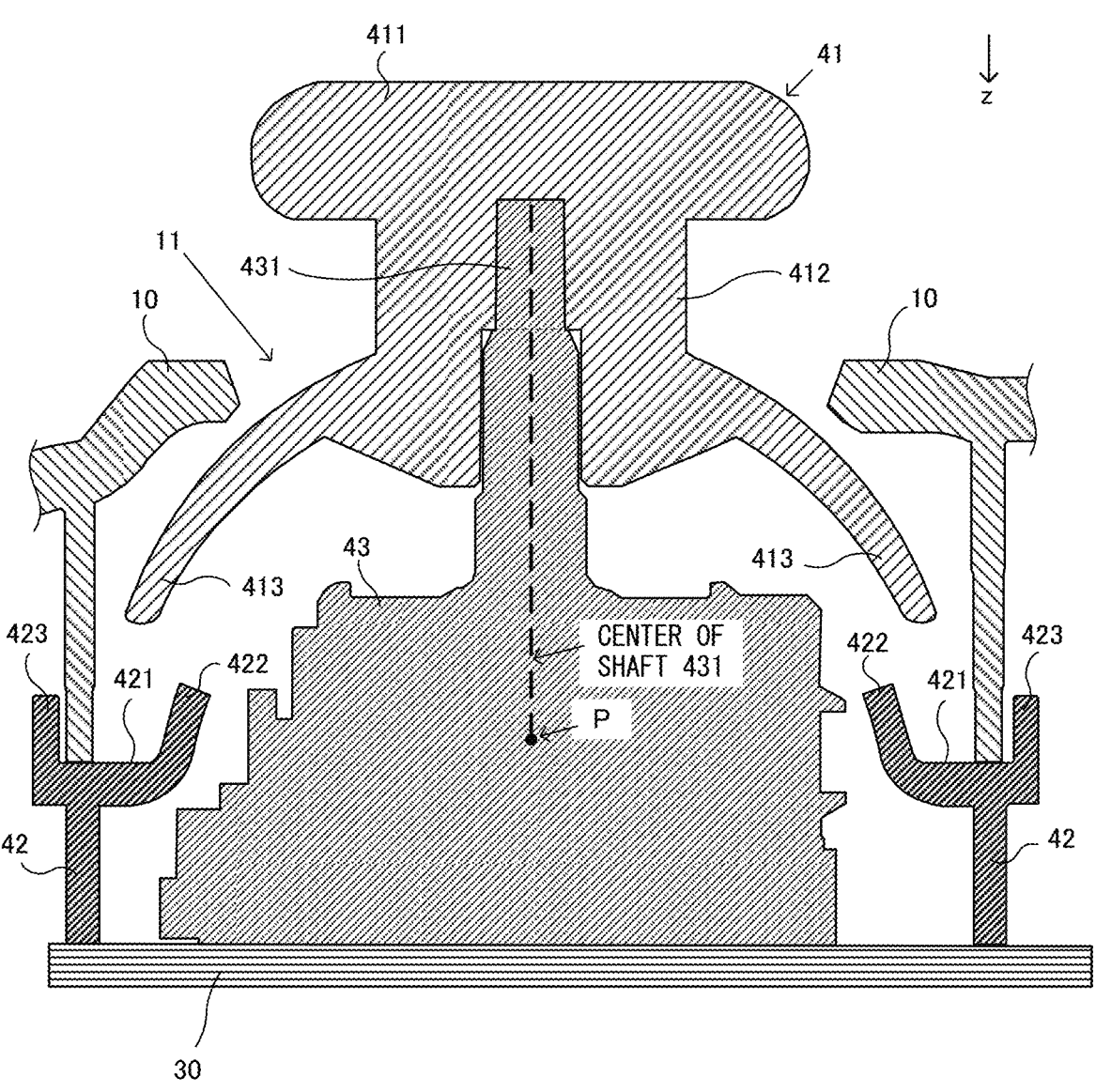
FIG. 10 is an example non-limiting diagram showing an example of an end surface of the game controller 1 when cut in the center of the analog stick 4 in a case where the operation member 41 is not tilted.

FIG. 10 is a diagram showing an example of an end surface of the game controller 1 when cut in the center of the analog stick 4 in a case where the operation member 41 is not tilted. It should be noted that FIG. 10 conceptually shows a portion related to the limitation on the tilt of the operation member 41 by the pedestal 42, and does not show a portion unrelated to the limitation on the tilt of the operation member 41. Further, a down direction in FIG. 10 coincides with the z-axis directions in FIGS. 1, 4, and the like.

As shown in FIG. 10, the stick shaft 431 of the analog stick main body part 43 is inserted into the shaft insertion opening 415 of the operation member 41, and the operation member 41 is fixed to the analog stick main body part 43. The key top 411 of the operation member 41 is exposed through the opening portion 11 of the first housing 10.

The stick shaft 431 of the analog stick main body part 43 is configured to be tilted with a point P as a fulcrum. It should be noted that in FIG. 10, a dashed line in the up-down direction passing through the point P indicates the center of the stick shaft 431 of the analog stick main body part 43. The center of the shaft 431 coincides with the center of the shaft portion 412 of the operation member 41. For example, when a force is applied to the key top 411 of the operation member 41 in the left-right direction in FIG. 10 by the user, the stick shaft 431 of the analog stick main body part 43 is tilted in the left-right direction. Further, when a force is applied to the key top 411 of the operation member 41 in a direction perpendicular to the plane of the paper of FIG. 10, the stick shaft 431 of the analog stick main body part 43 is tilted in the direction perpendicular to the plane of the paper of FIG. 10.

Figure 11:
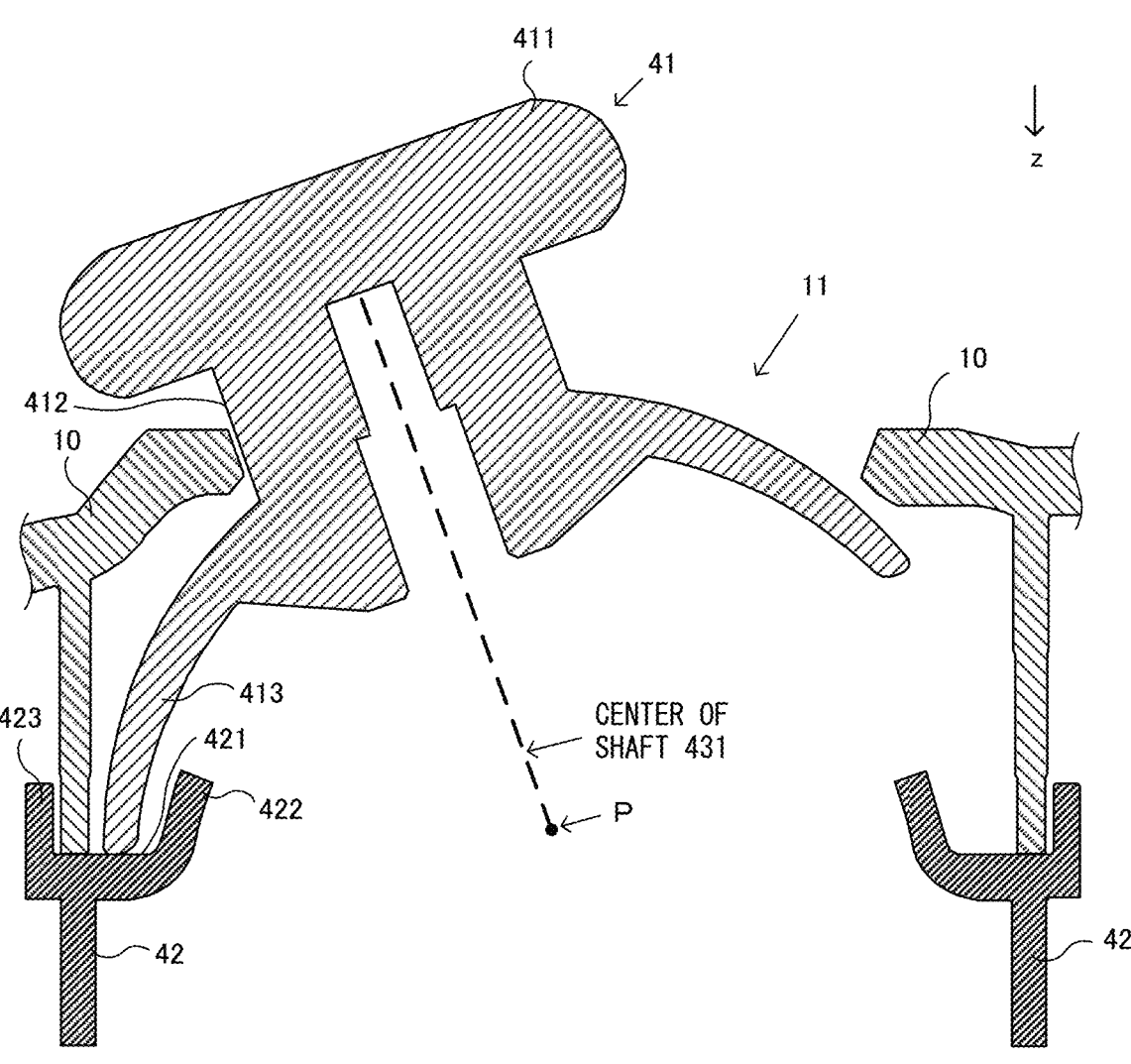
FIG. 11 is an example non-limiting diagram showing an example of the state where the operation member 41 is tilted in a left direction from the state of FIG. 10.

FIG. 11 is a diagram showing an example of the state where the operation member 41 is tilted in the left direction from the state of FIG. 10. FIG. 12 is a diagram showing an example of the state where the operation member 41 is tilted in the right direction from the state of FIG. 10. It should be noted that in FIGS. 11 and 12, for description, the analog stick main body part 43 is omitted except for the point P and the center of the stick shaft 431.

As shown in FIG. 11, when a force is applied to the key top 411 of the operation member 41 in the left direction, the operation member 41 is tilted to the left side and moves in a peripheral direction on the left side of the opening portion 11. Then, within the first housing 10, the extremity of the protruding portion 413 comes into contact with the contact surface 421 of the pedestal 42. Thus, the operation member 41 is not tilted any more in the left direction. That is, the extremity of the protruding portion 413 comes into contact with the pedestal 42, thereby limiting the tilt in the left direction of the operation member 41. At this time, the shaft portion 412 of the operation member 41 does not come into contact with the first housing 10.

Further, as shown in FIG. 12, when a force is applied to the key top 411 of the operation member 41 in the right direction, the operation member 41 is tilted to the right side and moves in the peripheral direction on the right side of the opening portion 11. Then, within the housing 10, the extremity of the protruding portion 413 comes into contact with the contact surface 421 of the pedestal 42. Thus, the operation member 41 is not tilted any more in the right direction. That is, the extremity of the protruding portion 413 comes into contact with the pedestal 42, thereby limiting the tilt in the right direction of the operation member 41. At this time, the shaft portion 412 of the operation member 41 does not come into contact with the first housing 10.

The same applies to a case where a force is applied to the key top 411 in any other direction. That is, when a force is applied to the key top 411 in any direction, the operation member 41 is tilted in the direction of the force, and the extremity of the protruding portion 413 comes into contact with the contact surface 421 of the pedestal 42. Consequently, the tilt of the operation member 41 (the movement in the peripheral direction of the opening portion 11) is limited. Even when the operation member 41 is tilted in any direction, the shaft portion 412 of the operation member 41 does not come into contact with the first housing 10. Thus, the user can obtain a non-conventional operational feeling. Further, the protruding portion 413 and the pedestal 42 come into contact with each other within the first housing 10. Thus, a sound associated with the contact is unlikely to leak to outside.

When the tilt of the stick shaft 431 of the analog stick main body part 43 is not limited by another member, the stick shaft 431 itself of the analog stick main body part 43 can be tilted to an angle greater than an angle shown in FIGS. 11 and 12. When the tilt of the stick shaft 431 of the analog stick main body part 43 is not limited by another member, the tilt of the stick shaft 431 of the analog stick main body part 43 can be tilted in any direction and at any angle up to a predetermined angle (e.g., 20 degrees, 30 degrees, or 45 degrees) with the state shown in FIG. 10 as a tilt angle of "0 degrees". However, when the analog stick main body part 43 is accommodated in the housing of the game controller 1, then as described above, the angle at which the operation member 41 is tilted is limited by the protruding portion 413 and the pedestal 42.

It should be noted that also when the tilt of the operation member 41 is limited by the protruding portion 413 and the pedestal 42, the shaft portion 412 of the operation member 41 and the first housing 10 may come into contact with each other. In this case, when the operation member 41 is tilted, the protruding portion 413 and the pedestal 42 may come into contact with each other before the shaft portion 412 and the first housing 10 come into contact with each other. That is, the operation member 41 is tilted, and the protruding portion 413 and the pedestal 42 come into contact with each other, and a force is further applied to elastically deform the protruding portion 413 or the pedestal 42, whereby the shaft portion 412 of the operation member 41 and the first housing 10 may come into contact with each other. Further, when the operation member 41 is tilted, the protruding portion 413 and the pedestal 42 may come into contact with each other, and simultaneously, the shaft portion 412 and the first housing 10 may come into contact with each other.

Further, on the contact surface 421 of the pedestal 42, a sheet (e.g., a nylon sheet, a fluorine sheet, or the like) having higher sliding properties than the pedestal 42 and the protruding portion 413 may be provided. A sheet having high sliding properties is provided on the contact surface 421, whereby it is possible to reduce resistance that occurs between the protruding portion 413 and the contact surface 421. Further, the protruding portion 413 may be formed of a material having higher sliding properties than the pedestal 42. That is, a material having high sliding properties may be used for at least a portion where the protruding portion 413 and the pedestal 42 come into contact with each other.

Further, on the contact surface 421 of the pedestal 42, a sheet-like cushioning material for absorbing shock may be provided. The cushioning material may be a material having higher shock absorption than the material of the pedestal 42, and may be formed of a foamed resin such as foamed polyurethane, foamed polyethylene, or the like. The cushioning material is provided on the contact surface 421, whereby it is possible to reduce sound generated when the protruding portion 413 comes into contact with the contact surface 421. Further, the cushioning material may be provided at the extremity of the protruding portion 413, or the entirety of the protruding portion 413 may be formed of the cushioning material. That is, the cushioning material may be provided in at least a portion where the protruding portion 413 and the pedestal 42 come into contact with each other.

The material of the protruding portion 412 of the operation member 41, the material of the pedestal 42, the presence or absence of a sheet on the contact surface 421 of the pedestal 42, and the material of a sheet may be optionally combined. For example, when a material having higher sliding properties than the protruding portion 413 is selected as the material of the pedestal 42, a sheet may not be provided, or a sheet having high cushioning properties may be provided. Further, when the same material as that of the protruding portion 413 is selected as the material of the pedestal 42, a sheet having higher sliding properties than the pedestal 42, a sheet having high cushioning properties, or a sheet having these properties may be provided on the contact surface 421.

Further, the contact surface 421 of the pedestal 42 and/or the extremity of the protruding portion 413 may be formed of a metal. In this case, when the extremity of the protruding portion 413 comes into contact with the contact surface 421, a metallic sound is generated. Consequently, the user can generate a relatively large operation sound by operating the analog stick 4 and transmit the operation sound also to outside the first housing 10. In this manner, it is possible to configure the game controller 1 more preferable for a user who likes an operation sound.

Here, it is also possible that the shaft portion 412 of the operation member 41 and the first housing 10 are brought into contact with each other, thereby limiting the tilt of the operation member 41. A description is given below of the difference between a configuration for limiting the tilt of the operation member 41 by the contact between the shaft portion 412 of the operation member 41 and the first housing 10, and a configuration for limiting the tilt of the operation member 41 by the contact between the protruding portion 413 and the pedestal 42 as in the exemplary embodiment.

FIG. 13 is a diagram showing an example of the state where contact points move when the tilt of the operation member 41 is limited by the contact between the shaft portion 412 of the operation member 41 and the first housing 10. FIG. 13 shows parts of the shaft portion 412 of the operation member 41 and the first housing 10 when viewed from the front surface of the game controller 1. The depth direction of the plane of the paper of FIG. 13 coincides with the z-axis in FIG. 1.

FIG. 14 is a diagram showing an example of the state where the shaft portion 412 of the operation member 41 and the first housing 10 come into contact with each other in a configuration in which the pedestal 42 is not provided. In FIG. 14, the operation member 41 before being tilted is indicated by a solid line, and the operation member 41 when the operation member 41 is tilted and the shaft portion 412 is in contact with the first housing 10 is indicated by a dashed line.

As shown in FIG. 13, before the operation member 41 is tilted, the center of the shaft portion 412 of the operation member 41 is located at the center of the circular opening portion 11 of the first housing 10. As shown in FIGS. 13 and 14, the radius of the shaft portion 412 of the operation member 41 is L1, and the radius of the opening portion 11 of the first housing 10 is L2 (>L1).

As shown in FIG. 13, for example, the operation member 41 is tilted in the up direction, the shaft portion 412 of the operation member 41 and the first housing 10 come into contact with each other. At this time, a contact point on the shaft portion 412 side is a point CPa, and a contact point on the first housing 10 side is a point CPh.

When the operation member 41 is operated so as to draw a circle (i.e., when the input direction of the analog stick 4 is changed with the shaft portion 412 remaining in contact with the first housing 10), then as shown in FIG. 13, the contact point CPa moves in the direction of an arrow in FIG. 13 on the circumference of the shaft portion 412. Further, the contact point CPh moves in the direction of an arrow in FIG. 13 along the periphery of the opening portion 11. The shaft portion 412 of the operation member 41 does not rotate about the shaft portion 412. Thus, the distance at which the contact point CPa moves is shorter than the distance at which the contact point CPh moves. Thus, when the operation member 41 is operated so as to draw a circular arc (when the input direction of the analog stick 4 is changed from the up direction to the right direction with the shaft portion 412 remaining in contact with the first housing 10), the shaft portion 412 moves from the position in the upper diagram to the position in the lower diagram in FIG. 13 while sliding on the periphery of the opening portion 11 of the first housing 10.

That is, there is a difference (hereinafter, "DF1") between the length of a portion of the shaft portion 412 that comes into contact with the first housing 10 (the perimeter of the shaft portion 412) and the length of a portion of the first housing 10 that comes into contact with the shaft portion 412 (the perimeter of the opening portion 11). Specifically, the difference DF1 is $2\pi\times$(L2−L1). When a circle is drawn while the shaft portion 412 is in contact with the first housing 10, the shaft portion 412 slides by the difference DF1.

Thus, when the operation member 41 is operated so as to draw a circle, there is a possibility that resistance occurs in a direction opposite to the operation direction by the friction between the shaft portion 412 and the first housing 10 and influences the operability.

In response to this, in the exemplary embodiment, the tilt of the operation member 41 is limited by the contact between the protruding portion 413 of the operation member 41 and the pedestal 42.

FIG. 15 is a diagram showing an example of the trajectory of a contact point when the tilt of the operation member 41 is limited by the contact between the protruding portion 413 of the operation member 41 and the pedestal 42. FIG. 15 shows a view of the pedestal 42 of the operation member 41 from the front surface of the game controller 1. The depth direction of the plane of the paper in FIG. 15 coincides with the z-axis in FIG. 1.

FIG. 16 is a diagram showing an example of the state where the protruding portion 413 of the operation member 41 and the pedestal 42 come into contact with each other. In FIG. 16, the operation member 41 before being tilted is indicated by a solid line, and the operation member 41 when the operation member 41 is tilted and the protruding portion 413 is in contact with the pedestal 42 is indicated by a dashed line.

As shown in FIG. 16, a contact point on the protruding portion 413 side when the extremity of the protruding portion 413 of the operation member 41 and the pedestal 42 are in contact with each other is a point CPa, and a contact point on the pedestal 42 side is a point CPb. When the operation member 41 is operated so as to draw a circle (i.e., when the input direction of the analog stick 4 is changed with the protruding portion 413 remaining in contact with the pedestal 42), then as shown in FIG. 15, the contact point CPb of the pedestal 42 moves so as to draw a circle. In FIG. 15, a dashed line indicates the trajectory of the contact point CPb.

As shown in FIG. 16, the distance between the contact point CPa (the extremity of the protruding portion 413) and the center of the stick shaft 431 when the operation member 41 is not tilted (i.e., the radius of the circle of the extremity of the protruding portion 413) is L3. When the operation member 41 is tilted in the right direction, the extremity of the protruding portion 413 moves and comes into contact with the pedestal 42. At this time, the distance between the center of the stick shaft 431 and the contact point CPb of the pedestal 42 is L4. Here, the distance L3 and the distance L4 are approximately equal to each other. That is, the length of the circumference of the circle of the extremity (the contact point CPa) of the protruding portion 413 is approximately equal to the length of the circumference of the circle of the trajectory of the contact point CPb of the pedestal 42 shown in FIG. 15. That is, when the operation member 41 is operated so as to draw a circle (i.e., when the input direction of the analog stick 4 is changed with the extremity of the protruding portion 413 remaining in contact with the pedestal 42), the distance at which the contact point CPa at the extremity of the protruding portion 413 moves and the distance at which the contact point CPb of the pedestal 42 shown in FIG. 15 moves are approximately equal to each other.

That is, the difference (hereinafter, "DF2") between the length of a portion of the protruding portion 413 that comes into contact with the pedestal 42 (the perimeter of the extremity of the protruding portion 413) and the length of a portion of the pedestal 42 that comes into contact with the protruding portion 413 (the perimeter of the contact surface 421 of the pedestal 42) is smaller than the difference DF1. When the operation member 41 is operated so as to draw a circle while the protruding portion 413 is in contact with the pedestal 42, the extremity of the protruding portion 413 slides by the difference DF2, but the difference DF2 is approximately "0".

Thus, when the operation member 41 is operated so as to draw a circle, the extremity of the protruding portion 413 rolls without sliding on the contact surface 421 of the pedestal 42. Thus, when the operation member 41 is operated so as to draw a circle, it is possible to suppress resistance when the operation is performed.

Further, the extremity of the protruding portion 413 is formed into a round shape. Thus, when the extremity of the protruding portion 413 comes into contact with the contact surface 421 of the pedestal 42, a force is dispersed. It should be noted that the extremity of the protruding portion 413 may be formed into a planar shape, and the extremity of the protruding portion 413 and the contact surface 421 may be configured to come into surface contact with each other.

Further, in the pedestal 42, the inner wall 422 and the outer wall 423 extending upward (in the negative z-axis direction) above the contact surface 421 are provided. Thus, it is possible to prevent a position shift between the operation member 41 and the pedestal 42.

Further, the inner wall 422 of the pedestal 42 is formed so as to extend upward and toward the center of the shaft portion 412. Thus, it is possible to secure the path on which the protruding portion 413 moves when the operation member 41 is tilted. Even when the operation member 41 is tilted, it is possible to prevent the protruding portion 413 from hitting the inner wall 422. Further, even when an error in manufacturing or assembling occurs, it is possible to sufficiently secure the path on which the protruding portion 413 moves.

It should be noted that the difference DF2 does not necessarily need to be "0". That is, there may be some difference between the length of the portion of the protruding portion 413 that comes into contact with the pedestal 42 (the perimeter of the extremity of the protruding portion 413) and the length of the portion of the pedestal 42 that comes into contact with the protruding portion 413 (the perimeter of the contact surface 421 of the pedestal 42). Also in this case, the difference DF2 is smaller than the difference DF1.

It should be noted that a ring member may be provided in the periphery of the opening portion 11 of the first housing 10. FIG. 17 is a diagram showing an example of a partially enlarged view when a ring member 12 is provided in the opening portion 11 of the first housing 10. As shown in FIG. 17, the ring member 12 is provided so as to cover the periphery of the opening portion 11. The ring member 12 may be formed of a material having higher sliding properties than the first housing 10 (e.g., a POM resin, a PA (nylon/polyamide) resin, a PBT resin, or the like). The ring member 12 may be formed as a component different from the first housing 10 and bonded to the first housing 10, or may be formed with the first housing 10 by integral molding. Further, the ring member 12 may be formed in a color different from that of the first housing 10.

FIG. 18 is a diagram showing an example of an end surface of the game controller 1 when cut in the center of the analog stick 4 in the configuration in which the ring member 12 is provided in the periphery of the opening portion 11 of the first housing 10. As shown in FIG. 18, when the operation member 41 is tilted in the right direction, the pedestal 42 limits the tilt of the operation member 41. In this case, the shaft portion 412 of the operation member 41 does not come into contact with the ring member 12. The same applies to a case where the operation member 41 is tilted in any direction.

As described above, when the ring member 12 having high sliding properties is provided in the periphery of the opening portion 11 of the first housing, and even if the shaft portion 412 and the ring member 12 come into contact with each other, it is possible to make resistance that occurs between the shaft portion 412 and the ring member 12 when the operation member 41 is operated so as to draw a circle, relatively small.

As described above, the game controller 1 according to the exemplary embodiment includes the housing including the opening portion 11, and the operation member 41. The operation member 41 includes the key top 411 to be operated by the user, the shaft portion 412 extending downward from the key top 411, and the protruding portion 413 protruding from the shaft portion 412. Within the housing (the first housing 10 and the second housing), the pedestal 42 is provided that comes into contact with the protruding portion 413 when the operation member 41 is tilted. Thus, it is possible to limit the tilt of the operation member 41 by the pedestal 42 and the protruding portion 413. That is, by the protruding portion 413 and the pedestal 42, it is possible to limit the movement of the operation member 41 in the peripheral direction of the opening portion 11. Further, when the pedestal 42 is formed of a material having high sliding properties, it is possible to suppress resistance that occurs between the pedestal 42 and the extremity of the protruding portion 413.

Further, the perimeter of the extremity of the protruding portion 413 and the perimeter of the portion of the contact surface 421 of the pedestal 42 that comes into contact with the extremity of the protruding portion 413 are approximately equal to each other. Thus, when the operation member 41 is operated so as to draw a circle, the protruding portion 413 rolls without sliding on the contact surface 421 of the pedestal 42. Consequently, it is possible to make the operability excellent.

Further, when the ring member 12 is provided in the periphery of the opening portion 11 of the first housing 10, the shaft portion 412 comes into contact with the ring member 12, and does not come into direct contact with the shaft portion 412 and the first housing 10. The ring member 12 is formed of a material having higher sliding properties than the first housing 10. Thus, it is possible to reduce resistance force to be generated by the shaft portion 412 and the ring member 12 coming into contact with each other, as compared with resistance force to be generated by the shaft portion 412 and the first housing 10 coming into contact with each other.

(Variations)

While the exemplary embodiment has been described above, various variations may be made in another exemplary embodiment.

For example, in the above exemplary embodiment, the pedestal 42 is a ring-shaped member, and the contact surface 421 is a flat surface. In another exemplary embodiment, the contact surface 421 may have recesses and protrusions. For example, the contact surface 421 may include recessed portions or protruding portions in four directions, namely up, down, left, and right directions, or eight directions, namely up, down, left, right, and oblique directions.

FIG. 19 is a diagram showing an example of the contact surface 421 when recessed portions are formed on the contact surface 421 of the pedestal 42. FIG. 19 shows the contact surface 421 of the pedestal 42. As shown in FIG. 19, in four directions, namely up, down, left, and right directions, and four oblique directions on the ring-shaped contact surface 421, recessed portions 425 (425a to 425h) may be formed. The recessed portions 425 are portions formed into recessed shapes in the depth direction of the plane of the paper in FIG. 19, and for example, may be formed into arcuate shapes. The contact surface 421 between two of the recessed portions 425 may be formed into a flat surface, or may be formed into a protruding shape. When such a pedestal 42 is used, it is possible to guide the inputs of the eight directions. For example, when the user inputs the up direction, the extremity of the protruding portion 413 of the operation member 41 is fitted to the recessed portion 425a, thereby facilitating the input of the up direction.

It should be noted that the recesses and protrusions shown in FIG. 19 may be provided in the protruding portion 413. That is, a configuration may be employed in which the recesses and protrusions are provided at the extremity of the protruding portion 413, thereby guiding the inputs of predetermined directions (four directions, namely up, down, left, and right directions, and four oblique directions, or other directions).

Further, in the above exemplary embodiment, the opening portion 11 of the first housing 10 has a circular shape. Alternatively, in another exemplary embodiment, the shape of the opening portion 11 may be an ellipse, or may be a polygon (e.g., an octagon). Also in this case, as described above, a configuration is employed in which the tilt of the operation member 41 is limited by the protruding portion 413 of the operation member 41 and the pedestal 42 coming into contact with each other, so that the shaft portion 412 of the operation member 41 does not come into contact with, or is less likely to come into contact with, the periphery of the opening portion of the first housing 10.

Further, the shapes of the key top 411, the shaft portion 412, and the protruding portion 413 of the operation member 41, the pedestal 42, and the like described above are merely examples, and these components may have other shapes. For example, in the above exemplary embodiment, the pedestal 42 is formed into a ring shape of which a center portion has a hole. Alternatively, in another exemplary embodiment, the pedestal 42 may be a circular plate. Further, the protruding portion 413 of the operation member 41 may have not only the umbrella shape described above but also another shape. For example, the protruding portion 413 may be so shaped as to extend in the horizontal direction of the shaft portion 412 (a direction away from the center of the shaft portion 412) and extend bending sharply downward in the middle. Then, when the operation member 41 is tilted, the protruding portion 413 may come into contact with the pedestal 42, and the tilt of the operation member 41 may be limited by this contact.

Further, in the above exemplary embodiment, the pedestal 42 is formed as a member separate from the housing. In another exemplary embodiment, a pedestal may be formed as a part of the housing. FIG. 20 is a diagram showing an example of the configuration of another exemplary embodiment.

FIG. 20 conceptually shows an example of an end surface of the game controller when cut in the center of the analog stick 4 in a case where the pedestal 42 is formed as a part of the first housing 10. As shown in FIG. 20, the first housing 10 and the pedestal 42 are formed in a unified manner That is, the first housing 10 includes the contact surface 421 that, when the operation member 41 is tilted, comes into contact with the protruding portion 413 of the operation member 41 within the first housing 10. Further, the pedestal 42 as a part of the first housing 10 includes the inner wall 422 and the outer wall 423. The tilt of the operation member 41 is limited by the pedestal 42 as a part of the first housing 10. Further, in the periphery of the opening portion 11 of the first housing 10, the ring member 12 shown in FIG. 18 may be provided.

Further, in the above exemplary embodiment, in the first housing 10, the opening portion 11 is provided, and the analog stick 4 is formed of the operation member 41 of which a part is exposed through the opening portion 11, the pedestal 42, and the analog stick main body part 43. In another exemplary embodiment, a part of the analog stick 4 may be formed as a part of the housing. That is, the analog stick 4 may be formed of a housing member exposed to outside, the operation member 41, the pedestal 42, and the analog stick main body part 43. Then, an opening may be provided in a housing of a controller main body forming the external shape of a controller, and the housing member as a part of the analog stick 4 and the operation member 41 may be exposed through this opening.

Further, in the above exemplary embodiment, the tilt of the operation member 41 is limited by the extremity of the protruding portion 413 of the operation member 41 coming into contact with the pedestal 42 provided below the protruding portion 413 (in the z-axis direction). In another exemplary embodiment, the tilt of the operation member may be limited by another portion of the protruding portion 413 coming into contact with the pedestal. For example, when the operation member is tilted, the side surface of the protruding portion of the operation member may come into contact with the pedestal, and the tilt of the operation member may be limited by this contact.

Further, in the above exemplary embodiment, using the analog stick main body part 43 that can be tilted in any direction, the tilt of the analog stick 4 is limited by the operation member 41 and the pedestal 42. In another exemplary embodiment, such limitation may be applied to a slide pad slidable in the horizontal direction (a direction parallel to the surface of the housing).

Further, the above analog stick 4 may be applied to an information processing apparatus including an input device. That is, in an information processing apparatus unified with an input device, the input device may include the analog stick 4. For example, a mobile game apparatus may include the above analog stick 4. Further, a smartphone, a tablet terminal, or a personal computer may include the above analog stick 4.

Next, a pressure sensor provided in the game controller according to the exemplary embodiment is described. In the game controller according to the exemplary embodiment, a pressure sensor 44 that detects pressure is provided between the operation member 41 and the pedestal 42 described above. FIG. 21 is an example of an exploded perspective view showing a part of the analog stick 4 of the game controller according to the exemplary embodiment. FIG. 22 is a diagram showing an example of an end surface of the game controller according to the exemplary embodiment when cut in the center of the analog stick 4. FIG. 23 is a diagram showing an example of the end surface when the operation member 41 is tilted in the right direction. It should be noted that similarly to FIG. 10, FIGS. 22 and 23 only show main portions and omit other portions.

As shown in FIGS. 21 and 22, the pressure sensor 44 is provided between the operation member 41 and the pedestal 42. The pressure sensor 44 is placed on the contact surface 421 of the pedestal 42. For example, an adhesive may be applied to a back surface of the pressure sensor 44 (or the contact surface 421), and the pressure sensor 44 may be fixed to the contact surface 421 of the pedestal 42. When the operation member 41 is tilted, the extremity of the protruding portion 413 of the operation member 41 comes into contact with a front surface of the pressure sensor 44. It should be noted that the front surface of the pressure sensor 44 may be formed of a material having high sliding properties (a low coefficient of friction). A member having high sliding properties may be separately provided on the front surface of the pressure sensor 44. For example, a sheet may be pasted to the front surface of the pressure sensor 44.

The pressure sensor 44 outputs a pressure value relating to an applied force. The pressure sensor 44 is formed of a laminar member formed into a circular ring shape. As the pressure sensor 44, a resistive pressure sensor may be used, or a capacitive pressure sensor may be used, or a pressure sensor using any other method may be used. It should be noted that a strain gauge that detects an applied force may be used instead of the pressure sensor 44. That is, an appropriate sensor may be used so long as the sensor can detect an applied force.

As shown in FIG. 23, when the operation member 41 is tilted in the right direction, for example, the extremity of the protruding portion 413 comes into contact with the pedestal 42 through the pressure sensor 44. That is, it can be said that the extremity of the protruding portion 413 comes into direct contact with the pressure sensor 44 and comes into indirect contact with the pedestal 42. This contact limits the further tilt of the operation member 41 in the right direction. The pressure sensor 44 detects pressure relating to this contact.

It should be noted that, although not shown in the figures, a lead for outputting a signal relating to applied pressure is connected to the pressure sensor 44. The lead is connected to the substrate 30, for example. On the substrate 30, a circuit is provided that processes a signal from the analog stick main body part 43 (a signal including information regarding the tilt direction and the tilt angle) and a signal from the pressure sensor 44. Information processed by the circuit (information regarding the tilt direction, the tilt angle, and pressure when the operation member 41 is tilted) is transmitted from the game controller to the game apparatus, and the game apparatus performs game processing based on the information. For example, the moving direction of a virtual object may be controlled in accordance with the tilt direction, and game processing relating to a detected pressure value may also be performed. It should be noted that when the detected pressure value or a value relating to the pressure value is greater than or equal to a predetermined value, predetermined game processing may be performed. When the detected pressure value or the value relating to the pressure value is less than the predetermined value, the predetermined game processing may not be performed. Further, when the detected pressure value or the value relating to the pressure value is greater than or equal to the predetermined value, game processing relating to the pressure value or the value relating to the pressure value may be performed.

Also when the operation member 41 is tilted in any other direction, similarly, the extremity of the protruding portion 413 comes into contact with the pedestal 42 through the pressure sensor 44.

It should be noted that in a case where at least any one of the pressure sensor 44, the pedestal 42, and the operation member 41 is formed of a relatively soft member or a soft member is placed on the pressure sensor 44, and if a force in the tilt direction is applied to the operation member 41 when the extremity of the protruding portion 413 comes into contact with the pressure sensor 44, these soft members may elastically deform. By this elastic deformation, the operation member 41 tilts further than the tilt angle limited by the pedestal 42 and the sensor 44. Also in this case, the pedestal 42 and the sensor 44 limit the tilt of the operation member 41. That is, "the pedestal 42 limits the tilt of the operation member 41 (the movement of the operation member 41)" includes a case where the operation member 41 comes into (direct or indirect) contact with the pedestal 42, thereby preventing the operation member 41 from tilting any further, and a case where the operation member 41 comes into contact with the pedestal 42 and then slightly tilts further by elastic deformation.

It should be noted that as shown in FIG. 23, in the state where the operation member 41 is tilted, the first housing 10 and the shaft portion 412 do not come into contact with each other. In this state, however, the first housing 10 and the shaft portion 412 may come into contact with each other. That is, in a case where the tilt of the operation member 41 is limited by the pedestal 42 and the pressure sensor 44, the first housing 10 and the shaft portion 412 may come into contact with each other. Further, in a structure capable of elastically deforming as described above, in a case where the tilt of the operation member 41 is limited by the pedestal 42 and the pressure sensor 44, and elastic deformation as described above does not substantially occur, the first housing 10 and the shaft portion 412 may not come into contact with each other, and in a case where elastic deformation occurs, the first housing 10 and the shaft portion 412 may come into contact with each other. In this case, in a case where the tilt of the operation member 41 is limited by the pedestal 42 and the pressure sensor 44, and when a further force is applied to the operation member 41, a force applied to the pressure sensor 44 is distributed, and an excessive force can be made less likely to be applied to the pressure sensor 44. It should be noted that a configuration may be employed in which even when elastic deformation occurs, the first housing 10 and the shaft portion 412 do not come into contact with each other. Further, similarly to FIG. 18, in the state where the ring member 12 is provided in the periphery of the opening portion 11, and the operation member 41 is tilted, the shaft portion 412 and the ring member 12 may come into contact with each other. That is, in a case where the tilt of the operation member 41 is limited by the pedestal 42 and the pressure sensor 44, and even when elastic deformation as described above does not substantially occur, the ring member 12 and the shaft portion 412 may come into contact with each other. Further, in a case where the tilt of the operation member 41 is limited by the pedestal 42 and the pressure sensor 44, and when elastic deformation as described above does not substantially occur, the ring member 12 and the shaft portion 412 may not come into contact with each other, and when elastic deformation occurs, the ring member 12 and the shaft portion 412 may come into contact with each other.

Further, in FIG. 22. the pressure sensor 44 is provided on the pedestal 42 (the second portion). Alternatively, the pressure sensor 44 may be provided at the extremity of the protruding portion 413 (the first portion) of the operation member 41. For example, the pressure sensor 44 may be bonded and fixed to the extremity of the protruding portion 413 with an adhesive. Here, "the pressure sensor 44 is provided on the pedestal 42 or the protruding portion 413" means that the pressure sensor 44 is installed on the pedestal 42 or the protruding portion 413. If the pressure sensor 44 can detect pressure due to the contact between the pedestal 42 and the protruding portion 413, the pressure sensor 44 does not necessarily need to be fixed to the pedestal 42 or the protruding portion 413 with an adhesive or by other fixing means.

In FIG. 22, the pressure sensor 44 is provided on the pedestal 42, and the protruding portion 413 of the operation member 41 and the pressure sensor 44 come into direct contact with each other. As a variation, the pressure sensor 44 and the protruding portion 413 of the operation member 41 may come into indirect contact with each other. For example, the pressure sensor 44 may be placed on the pedestal 42, and a laminar circular ring-shaped member may be further placed on the pressure sensor 44. The protruding portion 413 of the operation member 41 may come into contact with the circular ring-shaped member, and the pressure sensor 44 may indirectly detect a load applied to the circular ring-shaped member.

It should be noted that the position of the pressure sensor 44 is not limited to that in FIG. 22. Variations of the exemplary embodiment are described below.

Figure 24:
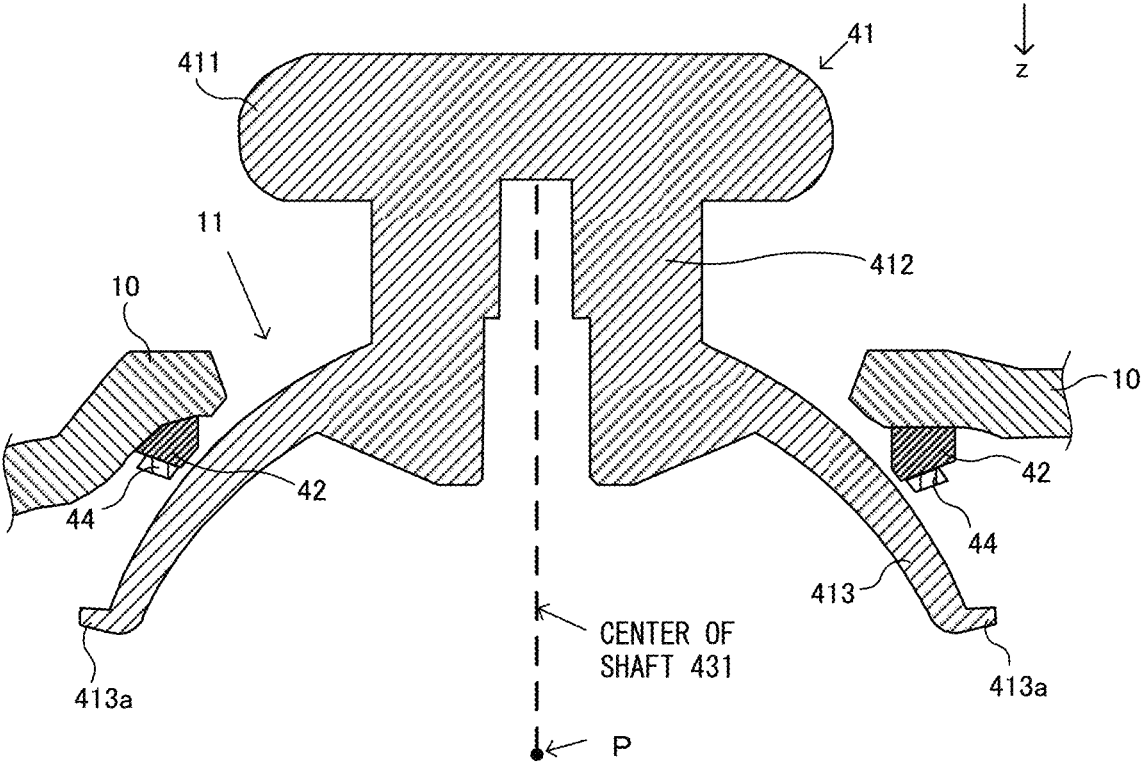
FIG. 24 is an example non-limiting diagram showing variation 1 of the exemplary embodiment.

FIG. 24 is a diagram showing variation 1 of the exemplary embodiment. In variation 1, as shown in FIG. 24, the pressure sensor 44 is provided on a back surface of the first housing 10. Specifically, the pedestal 42 is provided on the back surface of the first housing 10 (a surface inside the housing). The pedestal 42 is a member for limiting the tilt (the movement) of the operation member 41 and is an example of the second portion. The pedestal 42 is fixed to the back surface of the first housing 10. The pedestal 42 is formed into a circular ring shape and fixed near the periphery of the opening portion 11. Further, the pressure sensor 44 having a circular ring shape is fixed to the pedestal 42. At the extremity of the protruding portion 413 of the operation member 41, a protrusion 413*a* protruding from an outer side surface of the protruding portion 413 in the circumferential direction is provided.

Figure 25:
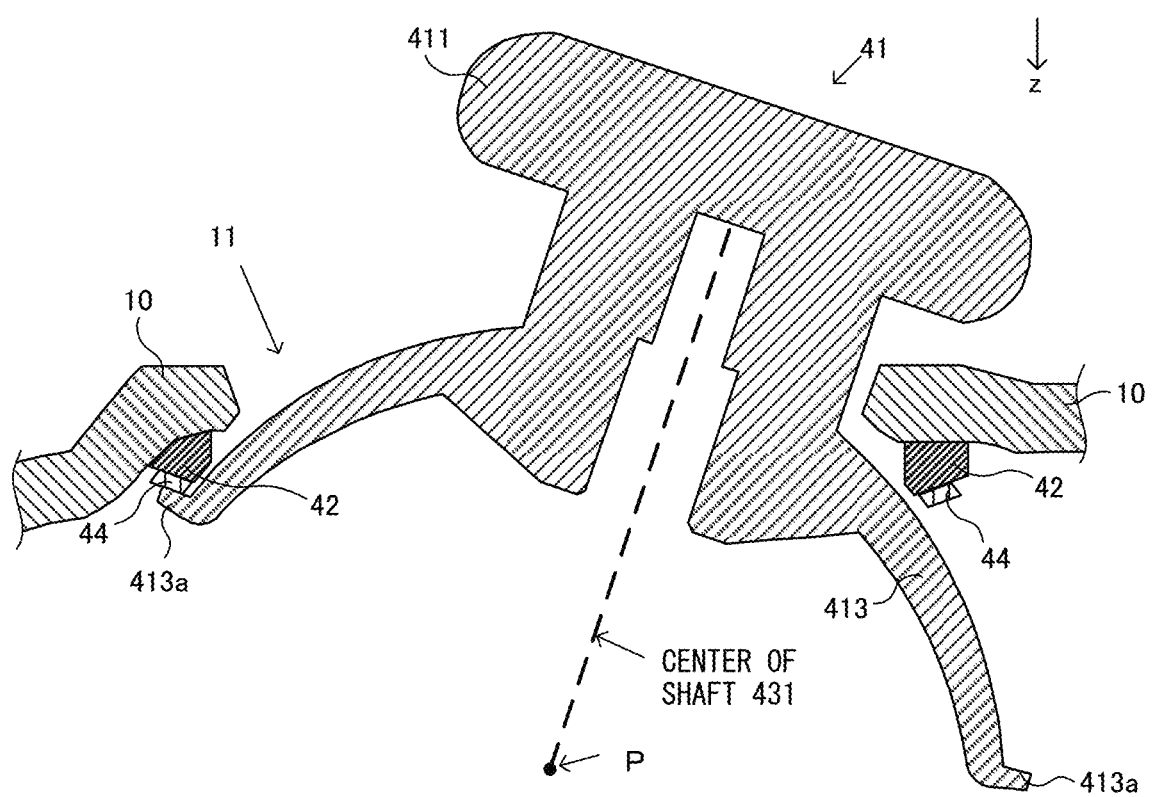
FIG. 25 is an example non-limiting diagram showing the state where the operation member 41 in FIG. 24 is tilted in the right direction.

FIG. 25 is a diagram showing the state where the operation member 41 in FIG. 24 is tilted in the right direction. As shown in FIG. 25, when the operation member 41 is tilted in the right direction, the protrusion 413*a* (the outer side surface of the protruding portion 413) provided at the extremity of the protruding portion 413 of the operation member 41 comes into contact with the pedestal 42 through the pressure sensor 44. This contact between the pedestal 42 and the protrusion 413*a* limits the further tilt of the operation member 41 in the right direction. Specifically, the protrusion 413*a* (the outer side surface of the protruding portion 413) comes into direct contact with the pressure sensor 44. The pressure sensor 44 detects pressure relating to this contact. Also when the operation member 41 is tilted in any other direction, similarly, the tilt of the operation member 41 is limited by the pedestal 42, and the pressure sensor 44 detects pressure applied when the operation member 41 is tilted. It should be noted that FIGS. 24 and 25 are merely examples, and the shapes of the members are not limited to those as shown in FIGS. 24 and 25. For example, the shapes of these members may be any shapes so long as a structure is employed in which, for example, when the operation member 41 is tilted in the right direction, the outer side surface of the protruding portion 413 on the left side comes into contact with the pressure sensor 44. For example, although the pressure sensor 44 is formed into an inclined circular ring shape in FIG. 24, the shape of the pressure sensor 44 is not limited to such a shape. For example, the pressure sensor 44 has a plate-like circular ring shape as shown in FIG. 21 and is fixed to the back side of the first housing 10 so that the pressure sensor 44 is horizontal in FIG. 24. The shape of an outer side surface of an extremity portion of the protruding portion 413 may be formed so that when the operation member 41 is tilted, the outer side surface of the protruding portion 413 comes into surface contact with the plate-like pressure sensor 44. Further, a part of the back side of the first housing 10 may be molded as in the pedestal 42 shown in FIG. 24. In this case, the part of the back side of the first housing 10 functions as the second portion that limits the tilt of the operation member 41. In this case, the "second portion" refers to a portion around a portion of the first housing 10 or the back surface of the first housing 10 with which the protrusion 413a comes into contact.

As described above, the second portion that limits the tilt (the movement) of the operation member 41 and the pressure sensor 44 may be provided on the back side of the first housing. When the operation member 41 is tilted, the outer side surface of the protruding portion 413 of the operation member 41 and the second portion on the back side of the first housing come into contact with each other. This contact limits the tilt of the operation member 41. The pressure sensor 44 is provided at the second portion. The pressure sensor 44 detects pressure applied due to the contact between the outer side surface of the protruding portion 413 and the second portion on the back side of the first housing.

It should be noted that the protrusion 413a may not be provided at the extremity of the protruding portion 413, and may be provided at any position on the outer side surface of the protruding portion 413. For example, the protrusion 413a may be provided between the extremity of the protruding portion 413 and the base of the protruding portion 413. In this case, the angle of the tilt of the operation member 41 is smaller than in the case shown in FIG. 25. Further, the protrusion 413a does not necessarily need to be provided so long as a structure is employed in which the tilt (the movement) of the operation member 41 is limited.

Figure 26:
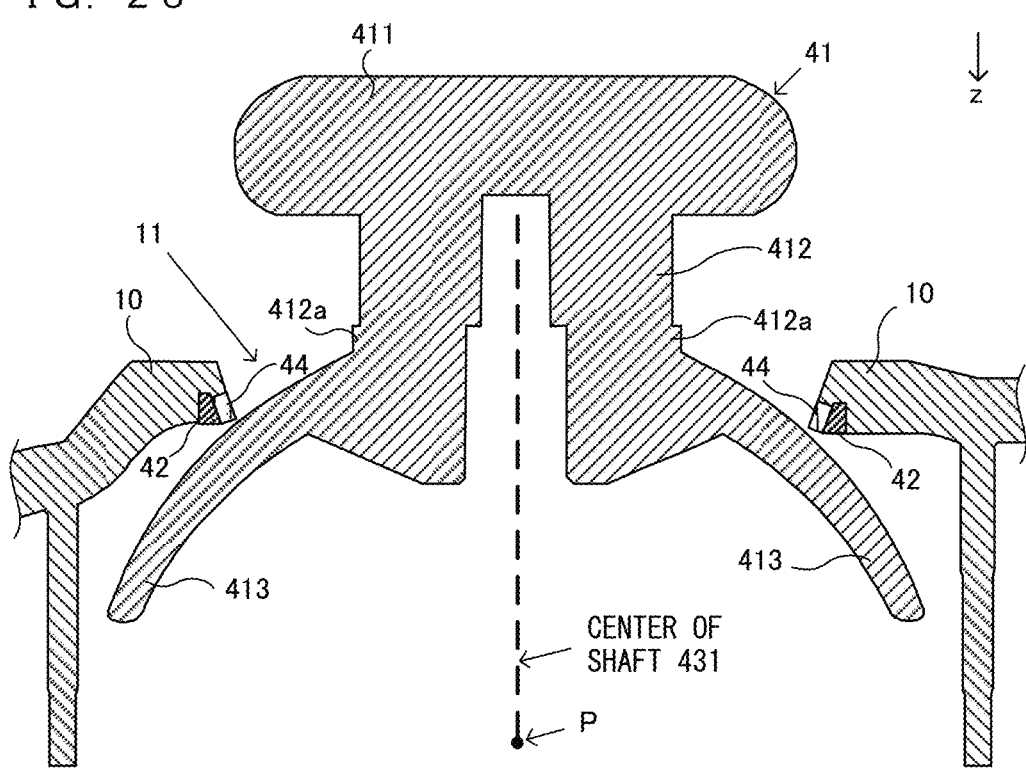
FIG. 26 is an example non-limiting diagram showing variation 2 of the exemplary embodiment.

FIG. 26 is a diagram showing variation 2 of the exemplary embodiment. In variation 2, as shown in FIG. 26, the pedestal 42 and the pressure sensor 44 are provided near the opening portion 11 on the back surface of the first housing 10. Specifically, the pressure sensor 44 having a circular ring shape is provided in the periphery of the opening portion 11 on the back surface of the first housing 10. The pedestal 42 having a circular ring shape is provided in the outer periphery of the pressure sensor 44. The pedestal 42 is a member for limiting the tilt (the movement) of the operation member 41 and is an example of the second portion. The pressure sensor 44 detects pressure when the operation member 41 and the pedestal 42 come into contact with each other. Further, a projection portion 412a is provided at a lower end of the shaft portion 412 of the operation member 41 (a connection portion between the shaft portion 412 and the protruding portion 413).

Figure 27:
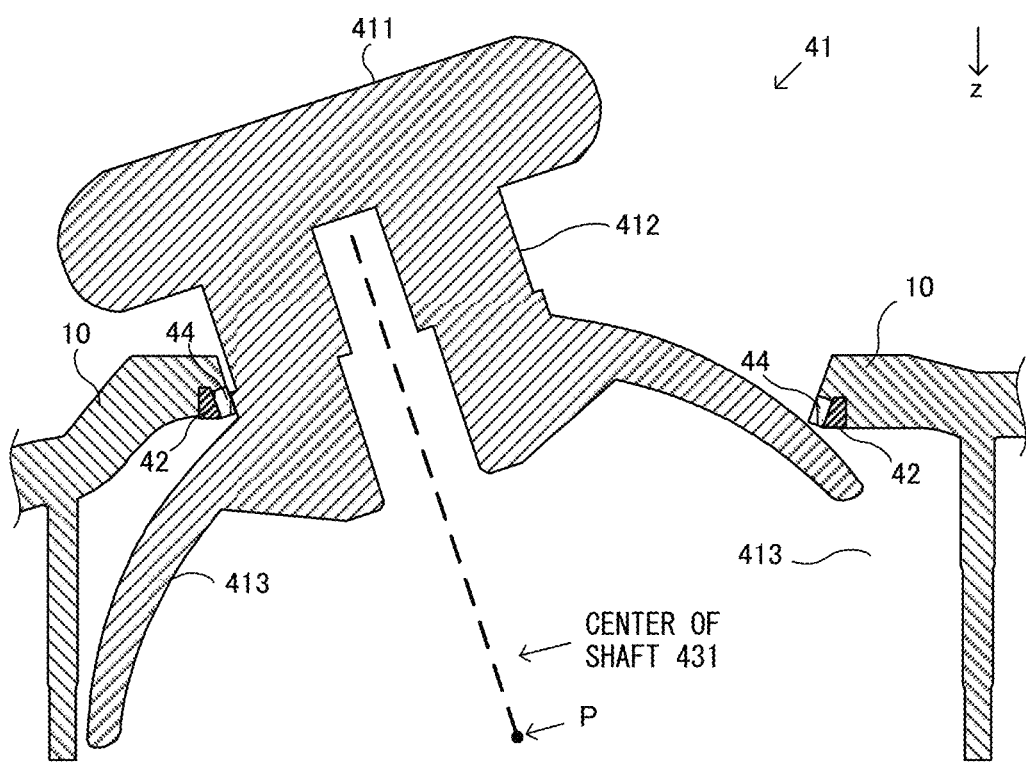
FIG. 27 is an example non-limiting diagram showing the state where the operation member 41 in FIG. 26 is tilted in the left direction.

FIG. 27 is a diagram showing the state where the operation member 41 in FIG. 26 is tilted in the left direction. As shown in FIG. 27, when the operation member 41 is tilted in the left direction, for example, the projection portion 412a of the shaft portion 412 comes into contact with the pedestal 42 through the pressure sensor 44, and this contact limits the further tilt of the operation member 41 in the left direction. Specifically, the projection portion 412a comes into direct contact with the pressure sensor 44. The pressure sensor 44 detects pressure relating to this contact. The same applies to a case where the operation member 41 is tilted in any other direction.

It should be noted that in variation 2, the pedestal 42 is provided, and the tilt (the movement) of the operation member 41 is limited by the pedestal 42. Alternatively, the tilt of the operation member 41 may be limited by the first housing 10. In this case, a part of the back surface of the first housing 10 functions as the second portion that limits the tilt of the operation member 41. That is, in this case, the "second portion" refers to a portion around a portion of the first housing 10 or the back surface of the first housing 10 with which the operation member 41 comes into contact. Further, the ring member 12 may be provided in the opening portion 11, and the tilt of the operation member 41 may be limited by the ring member 12. In this case, the pressure sensor 44 may be provided in the ring member 12.

Figure 28:
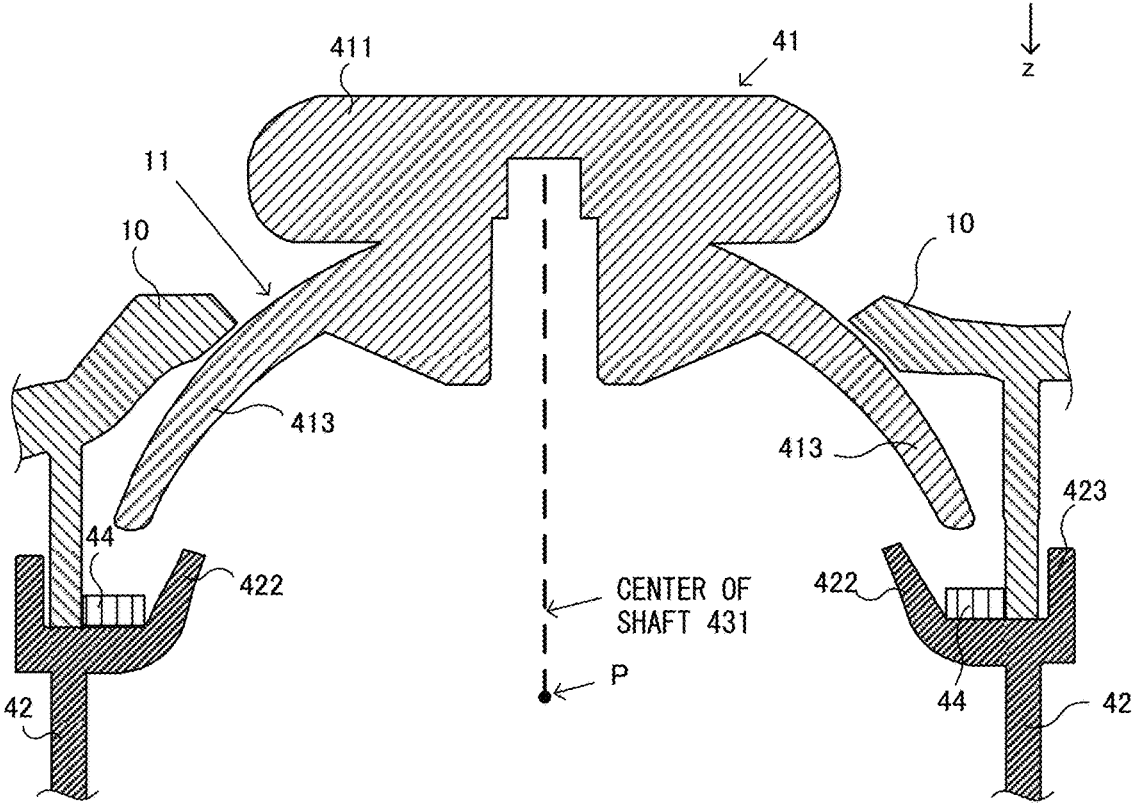
FIG. 28 is an example non-limiting diagram showing variation 3 of the exemplary embodiment.

FIG. 28 is a diagram showing variation 3 of the exemplary embodiment. In variation 3, as shown in FIG. 28, the protruding portion 413 having an umbrella shape is formed from the back side of the key top 411 of the operation member 41. A portion of the first housing 10 near the opening portion 11 is expanded in the up direction, and a part of the protruding portion 413 having the umbrella shape is covered by this expanded portion of the first housing 10. Also in such a configuration, the operation member 41 can be tilted about the shaft 431. That is, the operation member 41 shown in FIG. 28 includes the key top 411 that is operated by the user, and a shaft portion extending from the key top 411 through the opening portion 11 to inside the housing (e.g., a portion of the operation member 41 forming the shaft insertion opening 415). In variation 3, the pressure sensor 44 is provided on the pedestal 42 that limits the tilt of the operation member 41.

Figure 29:
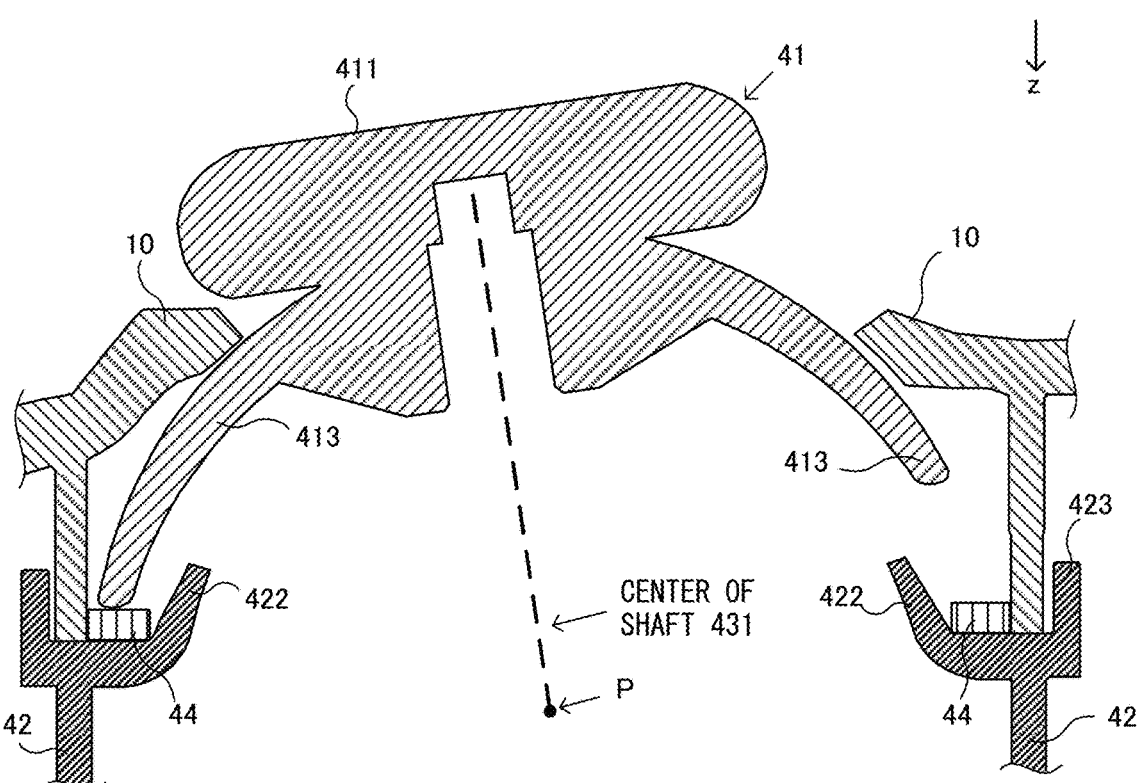
FIG. 29 is an example non-limiting diagram showing the state where the operation member 41 in FIG. 28 is tilted in the left direction.

FIG. 29 is a diagram showing the state where the operation member 41 in FIG. 28 is tilted in the left direction. As shown in FIG. 29, when the operation member 41 is tilted in the left direction, for example, the extremity of the protruding portion 413 of the operation member 41 comes into contact with the pedestal 42 through the pressure sensor 44, and this contact limits the further tilt of the operation member 41 in the left direction. Specifically, the extremity of the protruding portion 413 comes into direct contact with the pressure sensor 44. The pressure sensor 44 detects pressure relating to this contact. The same applies to a case where the operation member 41 is tilted in any other direction.

As described above, the game controller according to the exemplary embodiment includes a housing 10 including an opening 11, and an operation member 41, a part of which is exposed through the opening and which is movable in a peripheral direction of the opening. The operation member 41 includes a key top 411 exposed through the opening, a shaft portion (e.g., 412) extending from the key top 411 through the opening to inside the housing, and a first portion (a protruding portion 413) located inside the housing. Further, the game controller includes a second portion (e.g., a pedestal 42; or a part of the housing) which is within the housing, and when the operation member moves in the peripheral direction of the opening, limits the movement by the first portion coming into contact with the second portion. Further, the game controller includes a sensor that is at the first portion or the second portion and provides an output relating to a force applied due to the contact between the first portion and the second portion.

It should be noted that in the exemplary embodiment, the pressure sensor 44 that detects a pressure value is used. Alternatively, another sensor that detects an applied force may be used. For example, the pressure sensor 44 may be a sensor that does not output continuous values as a pressure value, but outputs "1" when a force greater than or equal to a predetermined force is applied, and outputs "0" when a force less than the predetermined force is applied.

While the exemplary embodiment has been described, the above description is merely illustrative, and the exemplary embodiment may be improved and modified in various manners. The configurations of the above exemplary embodiment and its variations can be optionally combined together unless they contradict each other.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An input device comprising a housing including an opening, and an operation member, a part of which is exposed through the opening and which is movable in a peripheral direction of the opening, the operation member including:

a key top exposed through the opening and operated by a user;

a shaft portion extending from the key top through the opening to inside the housing; and a first portion located inside the housing, the input device further comprising:

a second portion which is within the housing, and when the operation member moves in the peripheral direction of the opening, limits the movement by the first portion coming into contact with the second portion; and a first sensor that is at the first portion or the second portion and provides an output relating to a force applied due to the contact between the first portion and the second portion, wherein the first portion extends from the shaft portion, and wherein the first portion is configured such that when the operation member is moved in the peripheral direction of the opening and the first portion contacts the second portion, an upper surface of a first part of the first portion on a side opposite the peripheral direction of the opening is spaced from the housing.

2. The input device according to claim 1, further comprising a second sensor that detects a moving direction of the operation member.

3. The input device according to claim 1, wherein the first portion and the second portion come into contact with each other through the first sensor.

4. The input device according to claim 1, wherein the first portion protrudes in a direction away from a center of the shaft portion and in an inward direction of the housing.

5. The input device according to claim 1, wherein when the operation member moves in the peripheral direction of the opening, an extremity of the first portion comes into contact with the second portion.

6. The input device according to claim 5, wherein the extremity of the first portion has a round shape.

7. The input device according to claim 1, wherein when the operation member moves in a first direction, the first portion and the second portion come into contact with each other at a position in the first direction.

8. The input device according to claim 1, wherein the second portion includes a contact surface with which the first portion comes into contact, and a wall portion extending from the contact surface in an outward direction of the housing.

9. The input device according to claim 8, wherein the wall portion is in an end portion, on a center side of the shaft portion, of the contact surface.

10. The input device according to claim 1, wherein the second portion is formed of a material having a lower coefficient of friction than at least a peripheral portion of the opening in the housing.

11. The input device according to claim 1, wherein when the operation member moves in the peripheral direction of the opening, the first portion comes into contact with the second portion without the shaft portion coming into contact with the housing.

12. The input device according to claim 11, wherein when the operation member moves in the peripheral direction of the opening, the first portion comes into contact with the second portion, and then, the operation member further moves in the peripheral direction, whereby the shaft portion comes into contact with the housing.

13. The input device according to claim 1, wherein even if the operation member moves in any peripheral direction of the opening, the first portion comes into contact with the second portion.

14. The input device according to claim 13, wherein a portion of the first portion that comes into contact with the second portion has a circular shape, and a portion of the second portion that comes into contact with the first portion has a circular shape.

15. The input device according to claim 1, further comprising a cushioning material in a portion where the first portion and the second portion come into contact with each other.

16. The input device according to claim 1, wherein a difference between a length of a portion of the first portion that comes into contact with the second portion and a length of a portion of the second portion that comes into contact with the first portion is smaller than a difference between a perimeter of the shaft portion and a perimeter of the opening.

17. A game controller comprising a housing including an opening, and an operation member, a part of which is exposed through the opening and which is movable in a peripheral direction of the opening, the operation member including:

a key top exposed through the opening and operated by a user;

a shaft portion extending from the key top through the opening to inside the housing; and a first portion located inside the housing, the game controller further comprising:

a second portion which is within the housing, and when the operation member moves in the peripheral direction of the opening, limits the movement by the first portion coming into contact with the second portion; and a sensor that is at the first portion or the second portion and provides an output relating to a force applied due to the contact between the first portion and the second portion, wherein the first portion extends from the shaft portion, and wherein the first portion is configured such that when the operation member is moved in the peripheral direction of the opening and the first portion contacts the second portion, an upper surface of a first part of the first portion on a side opposite the peripheral direction of the opening is spaced from the housing.

18. An information processing apparatus comprising an input device, the input device including a housing including an opening, and an operation member, a part of which is exposed through the opening and which is movable in a peripheral direction of the opening, the operation member including:

a key top exposed through the opening and operated by a user;

a shaft portion extending from the key top through the opening to inside the housing; and a first portion located inside the housing, the input device further including:

a second portion which is within the housing, and when the operation member moves in the peripheral direction of the opening, limits the movement by the first portion coming into contact with the second portion; and a sensor that is at the first portion or the second portion and provides an output relating to a force applied due to the contact between the first portion and the second portion, wherein the first portion extends from the shaft portion, and wherein the first portion is configured such that when the operation member is moved in the peripheral direction of the opening and the first portion contacts the second portion, an upper surface of a first part of the first portion on a side opposite the peripheral direction of the opening is spaced from the housing.

* * * * *